United States Patent
Perron

(10) Patent No.: US 11,181,440 B2
(45) Date of Patent: Nov. 23, 2021

(54) OTDR METHOD TARGETING IDENTIFIED EVENT

(71) Applicant: EXFO Inc., Quebec (CA)

(72) Inventor: Stephane Perron, Quebec (CA)

(73) Assignee: EXFO Inc., Quebec (CA)

(*) Notice: Subject to any disclaimer, the term of this patent is extended or adjusted under 35 U.S.C. 154(b) by 0 days.

(21) Appl. No.: 16/589,873

(22) Filed: Oct. 1, 2019

(65) Prior Publication Data

US 2020/0116591 A1  Apr. 16, 2020

Related U.S. Application Data

(60) Provisional application No. 62/744,320, filed on Oct. 11, 2018.

(51) Int. Cl.
*G01M 11/00* (2006.01)
*H04B 10/071* (2013.01)
*H04B 10/077* (2013.01)

(52) U.S. Cl.
CPC .... *G01M 11/3136* (2013.01); *G01M 11/3145* (2013.01); *H04B 10/071* (2013.01); *H04B 10/0771* (2013.01); *H04B 2210/258* (2013.01)

(58) Field of Classification Search
CPC .................................................. G01M 11/3136
USPC ....................................................... 356/73.1
See application file for complete search history.

(56) References Cited

U.S. PATENT DOCUMENTS

| | | | |
|---|---|---|---|
| 5,155,439 A | 10/1992 | Holmbo et al. | |
| 5,305,078 A | 4/1994 | Lamonde | |
| 5,442,434 A | 8/1995 | Liao et al. | |
| 5,455,672 A | 10/1995 | Lamonde et al. | |
| 5,528,356 A | 6/1996 | Harcourt | |
| 5,708,500 A | 1/1998 | Anderson | |

(Continued)

FOREIGN PATENT DOCUMENTS

| | | | |
|---|---|---|---|
| CN | 102088315 A | * | 6/2011 |
| CN | 201947269 U | * | 8/2011 |

(Continued)

OTHER PUBLICATIONS

Roux et al., Application Note: New Breakthroughs in Faster and Easier Fiber Testing, All-in-one solutions for one-button, automated testing, Jul. 2012, JDS Uniphase Corporation.

(Continued)

*Primary Examiner* — Tarifur R Chowdhury
*Assistant Examiner* — Omar H Nixon
(74) *Attorney, Agent, or Firm* — Helene Chotard

(57) ABSTRACT

There is provided an OTDR method and device for characterizing an optical fiber link. At least a first OTDR acquisition is performed toward the optical fiber link. From the at least one first OTDR acquisition, one or more events are identified along the optical fiber link and a value of at least one characteristic associated with each event is estimated. A second OTDR acquisition is performed toward the optical fiber link in order to target a specific event among the identified events. Values of one or more OTDR acquisition parameters for the second OTDR acquisition are determined such that the OTDR acquisition parameters comprise a second pulse width different from the first pulse width used in the first OTDR acquisition.

18 Claims, 11 Drawing Sheets

(56) References Cited

U.S. PATENT DOCUMENTS

| | | | |
|---|---|---|---|
| 6,160,614 A * | 12/2000 | Unno | G01M 11/3136 |
| | | | 356/73.1 |
| 6,710,862 B1 | 3/2004 | Wilson et al. | |
| 7,515,276 B2 | 4/2009 | Froggatt et al. | |
| 7,808,621 B2 | 10/2010 | Russell | |
| 8,218,924 B1 | 7/2012 | Schantz et al. | |
| 8,482,725 B2 | 7/2013 | Perron et al. | |
| 8,576,389 B2 | 11/2013 | Perron et al. | |
| 8,655,167 B1 | 2/2014 | Lam et al. | |
| 8,711,341 B2 | 4/2014 | Blair et al. | |
| 9,184,833 B2 | 11/2015 | Kassler | |
| 9,228,922 B1 | 1/2016 | Doddridge | |
| 9,360,392 B2 | 6/2016 | Benjamin | |
| 9,419,707 B2 | 8/2016 | Daems | |
| 9,435,713 B2 | 9/2016 | Collier et al. | |
| 9,709,460 B2 | 7/2017 | Leblanc et al. | |
| 9,900,087 B2 | 2/2018 | Ruchet | |
| 9,973,271 B2 | 5/2018 | Jin et al. | |
| 10,200,118 B2 | 2/2019 | Ruchet | |
| 10,288,524 B2 | 5/2019 | Leclerc et al. | |
| 10,371,596 B2 | 8/2019 | L'Heureux et al. | |
| 10,862,582 B1 | 12/2020 | L'Heureux et al. | |
| 2014/0146312 A1 | 5/2014 | Perron et al. | |
| 2014/0198311 A1 | 7/2014 | L'Heureux et al. | |
| 2015/0198503 A1 | 7/2015 | Leblanc et al. | |
| 2016/0041065 A1 | 2/2016 | L'Heureux et al. | |
| 2016/0248499 A1 * | 8/2016 | Perron | H04B 10/071 |

FOREIGN PATENT DOCUMENTS

| | | |
|---|---|---|
| EP | 2955861 A1 | 12/2015 |
| WO | 2010076567 A1 | 7/2010 |

OTHER PUBLICATIONS

Park et al., Coded optical time domain reflectometry: principle and applications, Proc. of SPIE vol. 6781, 678129 (2007).

VIAVI Solutions, VIAVI T-Berd/MTS 2000: Using the OTDR in Real Time Mode, https://www.youtube.com/watch?v=jVvElvH1918&feature=youtu.be, uploaded on Oct. 10, 2017.

* cited by examiner

OTDR METHOD TARGETING IDENTIFIED EVENT

CROSS-REFERENCE TO RELATED APPLICATIONS

This application claims priority under 35USC § 119(e) of U.S. provisional patent application 62/744,320 filed Oct. 11, 2018; the specification of which is hereby incorporated by reference.

TECHNICAL FIELD

The present description generally relates to Optical Time-Domain Reflectometry (OTDR), and more particularly to assessing a target event along an optical fiber link using an Optical Time-Domain Reflectometer.

BACKGROUND

Optical Time-Domain Reflectometry (OTDR—also used to refer to the corresponding device) is also widely employed for characterization of optical fiber links. OTDR is a diagnostic technique where light pulses are launched in an optical fiber link and returning light, arising from backscattering and reflections along the fiber link, is detected and analyzed. Various "events" along the fiber link can be detected and characterized through a proper analysis of the returning light in the time domain and insertion loss of the fiber link under test, as well as each component along the link, can be characterized.

OTDR technology can be implemented in different manners and advanced OTDR technology typically involves multi-pulse acquisitions and analysis whereby the OTDR device makes use of multiple acquisitions performed with different pulse widths in order to provide different spatial resolution and noise level conditions for event detection and measurement along the optical fiber link under test and provide a complete mapping of the optical link. In multi-pulse approaches, shorter pulses are used to characterize the most proximal portion, i.e. the portion closest to the OTDR device, of the link under test with a better resolution, while longer pulses provide for more signal power to characterize portions of the optical link that are farther away, with a compromise on spatial resolution. The above-described multiple-pulsewidth approaches therefore offer significant improvement to the traditional single-pulsewidth approach.

Although multi-pulse OTDR technology can provide a detailed characterization of the optical link under test, the multiple acquisitions with different pulse widths imply a long acquisition time, which is not adapted to high-volume testing such as those required, e.g., in the context of data centers and especially web-scale data centers where the number of individual tests to be carried out is enormous.

OTDR acquisition time can be minimized by the use of a long pulse widths, which increase the level of backscattered signal received from the optical fiber link under test and thereby minimizes the required averaging time for a given dynamic range specification. However, longer pulses also mean a lower spatial resolution. Such acquisitions therefore tend to hide events that are too close from one another. In OTDR technology, this phenomenon is often referred to as event groups or merged events.

On the other end, Light Source—Power Meter (LS/PM) testing can provide a fast measurement of Tier-1 characteristics of optical fiber links, including the total link insertion loss, the total link length and the optical fiber link continuity. However, LS/PM testing cannot provide any characterization of individual events along the optical fiber link under test. Only end-to-end measurements are possible.

There therefore remains a need for a fast OTDR characterization method that can assess a complete optical fiber link including individual events therealong and not only the end-to-end characteristics such as the total link insertion loss, the total link length and the optical fiber link continuity.

SUMMARY

There is provided an OTDR method and device for characterizing an optical fiber link. At least a first OTDR acquisition is performed toward the optical fiber link. From the at least one first OTDR acquisition, one or more events are identified along the optical fiber link and a value of at least one characteristic associated with each event is estimated. A second OTDR acquisition is performed toward the optical fiber link in order to target a specific event among the identified events. Values of one or more OTDR acquisition parameters for the second OTDR acquisition are determined such that the OTDR acquisition parameters comprise a second pulse width different from the first pulse width used in the first OTDR acquisition.

In one embodiment, the second OTDR acquisition is performed toward the optical fiber link only if the estimated value of at least one characteristic does not meet an evaluation criterion. The OTDR acquisition can be fast (faster than multi-pulse measurements) when there is no issue on a link (i.e. no bad connector, bad splice or macrobend), but that can require more time to inspect apparent defects when needed. For example, such OTDR method can find applications where there is no specific request to specifically characterize every single event along the link, as long as a PASS status can be confirmed.

In another embodiment, the target event is the remote end of the optical fiber link under test, which is to be spliced with another length of optical fiber. Values of one or more OTDR acquisition parameters for the second OTDR acquisition are determined at least as a function of one characteristic associated with the target event. OTDR acquisitions performed using the determined OTDR acquisition parameters are repeated in a continuous manner and a value of at least one characteristic associated with the target event is estimated and displayed for each repeated OTDR acquisition. This function allows a user to monitor the splicing process by monitoring in real time at least one characteristic (e.g. loss and/or reflectance) of the target event (which was the end of fiber before splicing) and launch an OTDR measurement once the splicing process is completed to characterize the spliced optical fiber link.

In accordance with one aspect, there is provided an OTDR method for characterizing an optical fiber link, the OTDR method comprising:

performing at least one first OTDR acquisition toward the optical fiber link, wherein each OTDR acquisition is performed by propagating in the optical fiber link under test, a test signal corresponding to a first pulse width and detecting corresponding return light from the optical fiber link so as to obtain an OTDR trace representing backscattered and reflected light as a function of distance in the optical fiber link;

from said at least one first OTDR acquisition, identifying one or more events along the optical fiber link and estimating a value of at least one characteristic associated with each said one or more events;

upon a determination that the estimated value of at least one characteristic associated with at least one of said events does not meet an evaluation criterion,
determining one or more values of one or more OTDR acquisition parameters, wherein said OTDR acquisition parameters comprise a second pulse width different from said first pulse width;
performing a second OTDR acquisition toward the optical fiber link using the determined OTDR acquisition parameters.

Advantageously, the OTDR method that can be fast when there is no issue on a link under test, but that can require more time to inspect apparent defects when needed. In other words, this method can quickly indicate if the link under test is free of bad connectors, bad splices and macrobends. It can also locate issues if any. Because the method does not require detailed characterization of every single event along the link when the pass-fail criterion is met, it can minimize the mean measurement time per optical fiber link to be tested.

The OTDR method may perform an initial OTDR measurement (involving one or more OTDR acquisitions) with long pulses and therefore low spatial resolution. An initial assessment of the link under test, including any located event is performed from this initial measurement, based on established evaluation criterion, such as pass/fail thresholds. If all events meet the evaluation criterion (i.e. PASS results), there is no need for any further investigation and the assessment is completed in a short measurement time. It can be confirmed that the fiber link is free of bad connectors, bad splices or macrobends.

However, the initial fast OTDR measurement (performed with long pulses) tend to hide events that are close from one another. Therefore, in some cases, two of more events along the optical fiber link under test may not be distinguishable in the initial fast OTDR measurement and appear as merged such that it may even be impossible to identify that there actually are multiple events on what appear like a single one. In this case, respective characteristics of the merged events cannot be properly assessed, and a pass/fail status associated with the apparent single event may wrongly indicate a FAIL result, also referred to herein as a false FAIL result.

For example, when two or more events appear merged due to insufficient resolution, the insertion loss of the merged events cumulates in an apparent single event. The evaluation criterion for insertion loss may then wrongly indicate an insertion loss that exceeds the threshold for the apparent single event, whereas each individual event would have shown insertion loss below the threshold. A pass/fail status associated with the apparent single event may then indicate a false FAIL result. The same also applies to reflectance. Better resolution thus provides for more reliable application of the pass/fail thresholds.

Therefore, if (and optionally only if) a FAIL result is obtained for an event (corresponding to a potential defect), a further investigation is conducted to attempt to eliminate potential false FAIL results. In this case, an event-specific OTDR measurement may be performed using OTDR acquisition parameters that are selected to "optimally" inspect the targeted event. Increasing the spatial resolution to further investigate any potential fault may reveal events that were merged in the initial fast OTDR measurement, so as to better apply evaluation criterion and eliminate potential false FAIL results.

In accordance with another aspect, there is provided an OTDR device for characterizing an optical fiber link, the OTDR device comprising:

an OTDR acquisition device connectable toward an end of the optical fiber link for performing one or more OTDR acquisitions toward the optical fiber link, wherein each OTDR acquisition is performed by propagating in the optical fiber link under test, a test signal corresponding to a first pulse width and detecting corresponding return light from the optical fiber link so as to obtain an OTDR trace representing backscattered and reflected light as a function of distance in the optical fiber link;
a processing unit receiving the OTDR trace and comprising:
 i. an analyzing module configured for identifying one or more events along the optical fiber link from at least one OTDR trace, and for estimating a value of at least one characteristic associated with each said one or more events;
 ii. an event investigation module configured for, upon a determination that the estimated value of at least one characteristic associated with at least one of said events does not meet an evaluation criterion, determining values of one or more OTDR acquisition parameters for a second OTDR acquisition to be performed toward the optical fiber link, wherein said OTDR acquisition parameters comprises a second pulse width different from said first pulse width.

In accordance with yet another aspect, there is provided non-transitory computer-readable storage medium comprising instructions that, when executed, cause a processor to perform the steps of:
receiving data derived from at least one first OTDR acquisition performed toward an optical fiber link under test, wherein each OTDR acquisition is performed by propagating in the optical fiber link under test, a test signal corresponding to a first pulse width and detecting corresponding return light from the optical fiber link so as to obtain an OTDR trace representing backscattered and reflected light as a function of distance in the optical fiber link under test;
 a. from said at least one first OTDR acquisition, identifying one or more events along the optical fiber link and estimating a value of at least one characteristic associated with each said one or more events; and
 b. upon a determination that the estimated value of at least one characteristic associated with at least one of said events does not meet an evaluation criterion,
  i. determining values of one or more OTDR acquisition parameters for a second OTDR acquisition to be performed toward the optical fiber link, wherein said OTDR acquisition parameters comprise a second pulse width different from said first pulse width.

In some embodiments, values of one or more OTDR acquisition parameters are determined at least as a function of a characteristic associated with a target event.

In some embodiments, a value of at least one characteristic of merged events comprised in said target event is derived from the second OTDR acquisition.

In some other embodiments, an updated value of at least one characteristic associated with said target event is derived from the second OTDR acquisition.

A plurality of events may be identified along the optical fiber link from the first OTDR acquisition and said values of one or more OTDR acquisition parameters may be determined as a function of at least one characteristic associated with a target event among the plurality of events.

The selected OTDR acquisition parameters for the second OTDR acquisition may comprise an OTDR test signal pulse width, an OTDR signal pulse repetition rate, an averaging number, an OTDR acquisition time, a wavelength, a receiver gain and bandwidth, a sampling resolution, an acquisition range (start/end) and/or any other parameter that is being set by the OTDR device for performing an OTDR acquisition. The OTDR acquisition parameters may be selected as a function of one or more characteristic of the target event, in order to maximize the spatial resolution while providing a dynamic range suitable for assessing the target event.

In some embodiments, the dynamic range associated with the second OTDR acquisition may not allow to reach the end of the optical fiber link.

In some embodiments, the characteristic associated with the target event comprises at least one of an insertion loss and a cumulated loss before the target event.

In accordance with another aspect, there is provided a computer program comprising instructions that, when executed by a processor, cause the processor to perform a method according to any one of the above-described methods.

In this specification, unless otherwise mentioned, word modifiers such as "substantially" and "about" which modify a condition or relationship characteristic of a feature of features of an embodiment, should be understood to mean that the condition or characteristic is defined to within tolerances that are acceptable for proper operation of that embodiment in the context of an application for which it is intended.

Throughout this specification reference is made to optical reflectometric technology and more specifically to OTDR technology. It is noted that optical reflectometric technology is herein meant to encompass all variations of optical reflectometric technology to which the provided method and system may equivalently apply. Examples of such variations include Optical Frequency Domain Reflectometry (OFDR) (e.g., see U.S. Pat. No. 7,515,276 to FROGGATT et al), and coded OTDR technology (see Park et al. "Coded optical time domain reflectometry: principle and applications", Proc. of SPIE Vol. 6781, 678129 (2007)) also referred to as correlation OTDR. Other variations are also meant to be encompassed.

BRIEF DESCRIPTION OF THE DRAWINGS

Further features and exemplary advantages of the present invention will become apparent to the skilled person from the following detailed description, taken in conjunction with the appended drawings, in which.

Figure 1A:
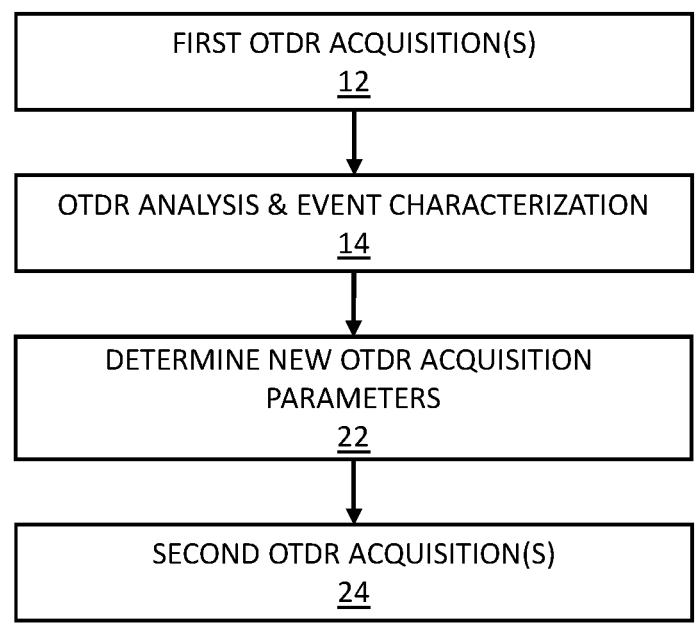
FIG. 1A is a flow chart illustrating an OTDR method for characterizing at least one event along an optical fiber link, in accordance with one embodiment.

It will be noted that throughout the drawings, like features are identified by like reference numerals. To not unduly encumber the figures, some elements may not be indicated in some figures if they were already identified in a preceding figure. It should be understood herein that elements of the drawings are not necessarily depicted to scale. Some mechanical or other physical components may also be omitted in order to not encumber the figures.

The following description is provided to gain a comprehensive understanding of the methods, apparatus and/or systems described herein. Various changes, modifications, and equivalents of the methods, apparatuses and/or systems described herein will suggest themselves to those of ordinary skill in the art. Description of well-known functions and structures may be omitted to enhance clarity and conciseness.

Although some features may be described with respect to individual exemplary embodiments, aspects need not be limited thereto such that features from one or more exemplary embodiments may be combinable with other features from one or more exemplary embodiments.

DETAILED DESCRIPTION

OTDR is a diagnostic technique for optical fiber links where a test signal in the form of light pulses is launched in the optical fiber link under test and the return light signal, arising from backscattering and reflections along the link, is detected. Herein, the process of launching a test signal and acquiring the return light signal to obtain therefrom an OTDR trace is referred to as an "OTDR acquisition". The acquired power level of the return light signal as a function of time is referred to as an "OTDR trace" or a "reflectometric trace", where the time scale is representative of distance between the OTDR acquisition device and a point along the fiber link.

In the following description, techniques that are generally known to one skilled in the art of OTDR measurement and OTDR trace processing and analysis will not be explained or detailed and in this respect, the reader is referred to available literature in the art. Such techniques that are considered to be known include, e.g., signal processing methods for identifying and characterizing events from an OTDR trace.

Each OTDR acquisition is understood to refer to the actions of propagating a test signal comprising one or more test light pulses having the same pulse width in the optical fiber link, and detecting corresponding return light signal from the optical fiber link as a function of time. A test light-pulse signal travelling along the optical fiber link will return towards its point of origin either through (distributed)

backscattering or (localized) reflections. The acquired power level of the return light signal as a function of time is referred to as the OTDR trace, where the time scale is representative of distance between the OTDR acquisition device and a point along the optical fiber link. Light acquisitions may be repeated with varied pulse width values to produce a separate OTDR trace for each test pulse width.

One skilled in the art will readily understand that in the context of OTDR methods and systems, each light acquisition generally involves propagating a large number of substantially identical light pulses in the optical fiber link and averaging the results. In this case, the result obtained from averaging will herein be referred to as an OTDR trace. It will also be understood that other factors may need to be controlled during the light acquisitions or from one light acquisition to the next, such as gain settings, pulse power, etc. as is well known to those skilled in the art.

"Backscattering" refers to Rayleigh scattering occurring from the interaction of the travelling light with the optical fiber media all along the fiber link, resulting in a generally sloped background light (in logarithmic units, i.e. dB, on the ordinate) on the OTDR trace, whose intensity disappears at the end of the range of the travelling pulse. "Events" along the fiber will generally result in a more localized drop of the backscattered light on the OTDR trace, which is attributable to a localized loss, and/or in a localized reflection peak. It will be understood that an "event" characterized by the OTDR method described herein may be generated by any perturbation along the fiber link which affects the returning light. Typically, an event may be generated by an optical fiber splice along the fiber link, which is characterized by a localized loss with little or no reflection. Mating connectors can also generate events that typically present reflectance, although these may be impossible to detect in some instances. OTDR methods and systems may also provide for the identification of events such as a fiber breakage, characterized by substantial localized loss and, frequently, a concomitant reflection peak, as well as loss resulting from a bend in the fiber. Finally, any other component along the fiber link may also be manifest as an "event" generating localized loss.

Now referring to the drawings, FIG. 1A is a flow chart illustrating an OTDR method for characterizing at least one event along an optical fiber link under test, in accordance with one embodiment.

In steps 12 and 14, a fast OTDR measurement is conducted on the optical fiber link.

First, in step 12, a first set of one or more OTDR acquisition(s) is performed toward the optical fiber link to be tested. In one embodiment, a single OTDR acquisition is performed using, e.g., preconfigured or predetermined acquisition parameters that are selected to cover a given maximum distance and loss range for an optical fiber link (e.g., 40 km and 15 dB). In other embodiments, a set of OTDR acquisitions are performed using a set of different acquisition parameters such as different pulse widths or different wavelengths.

In step 14, an OTDR analysis is conducted from the OTDR acquisitions obtained from step 12 in order to identify events along the optical fiber link, including the end of the optical fiber link, and provide a characterization of the identified events. Identification of the events may be made according to their locations, i.e. the distance along the optical fiber link at which the event is identified. It is common in the art to identify events on an OTDR trace by analyzing the OTDR trace to identify a localized drop in the backreflected/backscattered light and/or a reflectance peak. The presence of one or the other will generally be interpreted as an event.

It is also common in the art to characterize events along an optical fiber link by attributing values to three different characteristics: the location of the event along the optical fiber link, the insertion loss associated with the event and the reflectance at the event (when present). Depending on the circumstances, one or a combination of a plurality of these characteristics may be evaluated for a given event. In some embodiments, all three parameters are being evaluated in step 14 for each identified event. The result of this analysis is a list of events comprising values of location, as well as of insertion loss and reflectance associated with each event, and may be referred to as an OTDR measurement result.

In steps 22 and 24, a second OTDR acquisition is performed toward the optical fiber link in order to target a specific event among the identified events.

In step 22, values for a new set of OTDR acquisition parameters are determined for conducting an event-specific OTDR measurement. The new set of OTDR acquisition parameters to be determined may comprise a pulse width $\Delta t$, a pulse repetition period $P_{rep}$, an averaging number Av, an acquisition time T and/or any other parameter that is being set by the OTDR device for performing an OTDR acquisition.

Figure 5A:
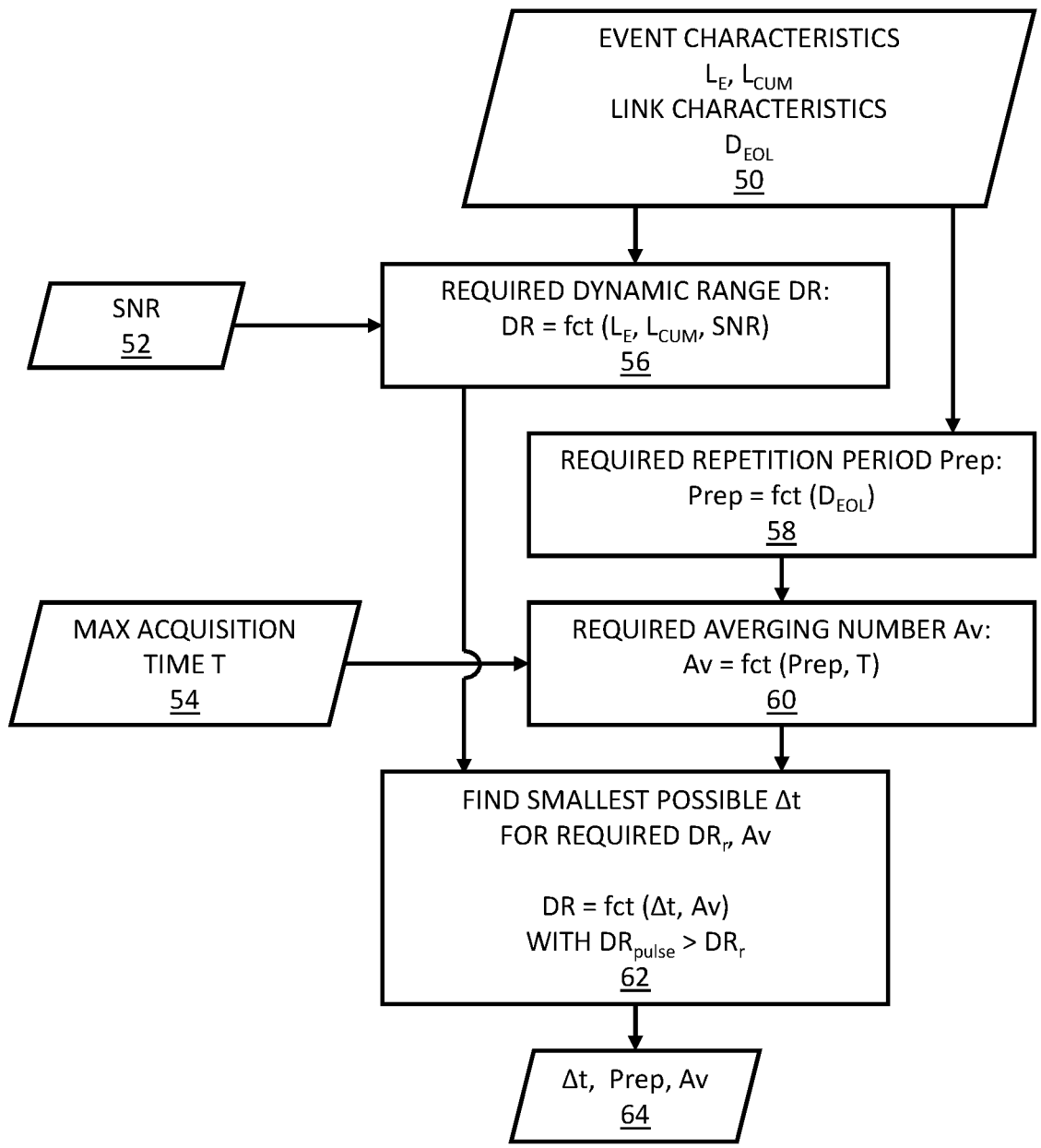
FIG. 5A is a flow chart illustrating steps of a method for selecting OTDR acquisition parameters to investigate a target event, in accordance with first embodiment.
Figure 5B:
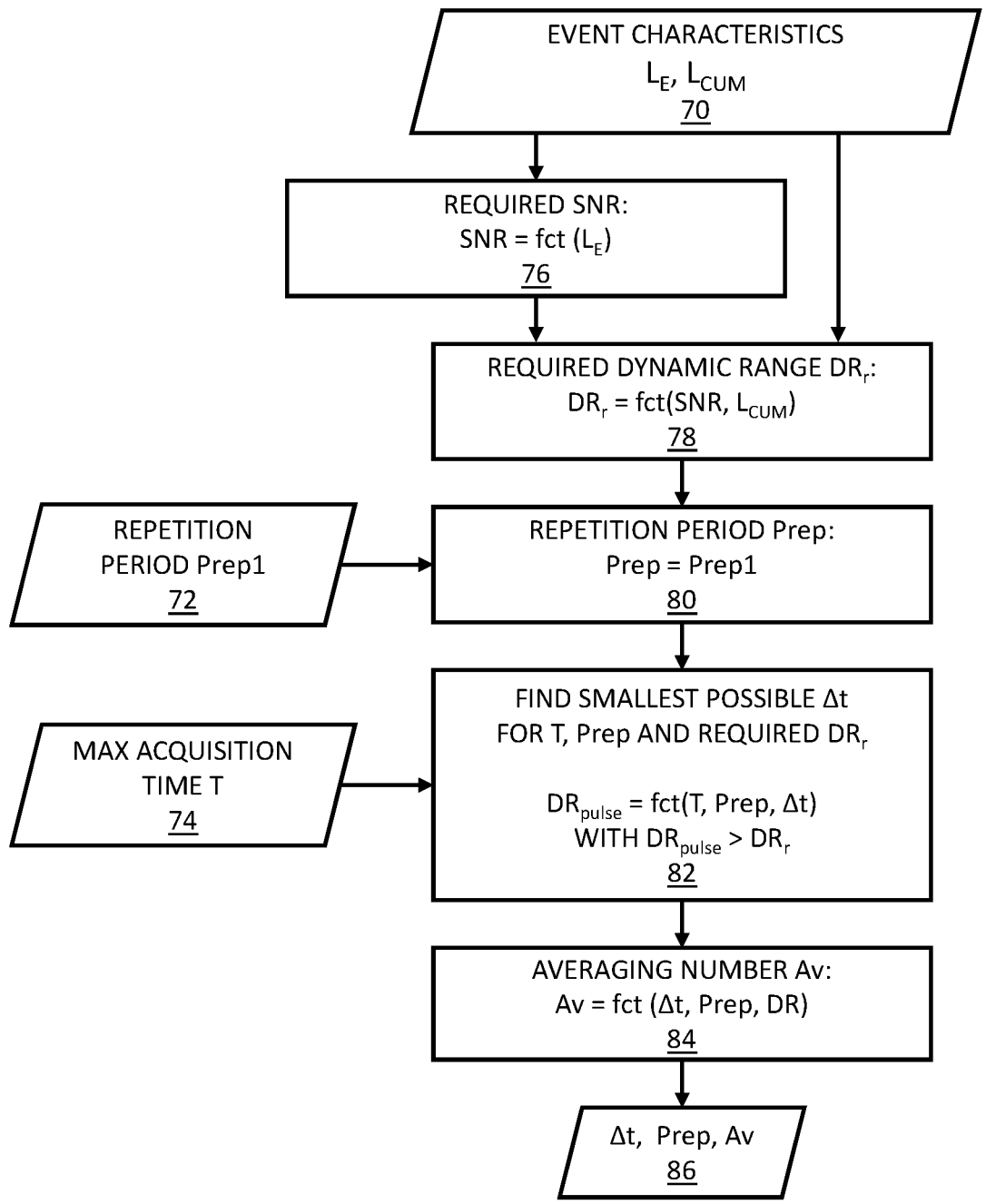
FIG. 5B is a flow chart illustrating steps of a method for selecting OTDR acquisition parameters to investigate a target event, in accordance with second embodiment.

In one embodiment, values of the new set of OTDR acquisition parameters are determined at least as a function of one characteristic of the target event (see FIGS. 5A and 5B). The new set of OTDR acquisition parameters may be determined as of function of one or more of the location $D_E$ of the target event E, the insertion loss $L_E$ of the target event E, the reflectance $R_E$ of the target event E, the cumulated loss $L_{CUM}$ before the target event E, and the location $D_{EOL}$ of the end of the optical fiber link.

Furthermore, the new set of OTDR acquisition parameters may be determined to satisfy an allowed acquisition time (e.g., 2 to 15 sec) and a dynamic range sufficient to characterize the target event. Step 22 may determine acquisition parameters that satisfy these requirements while maximizing the spatial resolution.

Figure 5C:
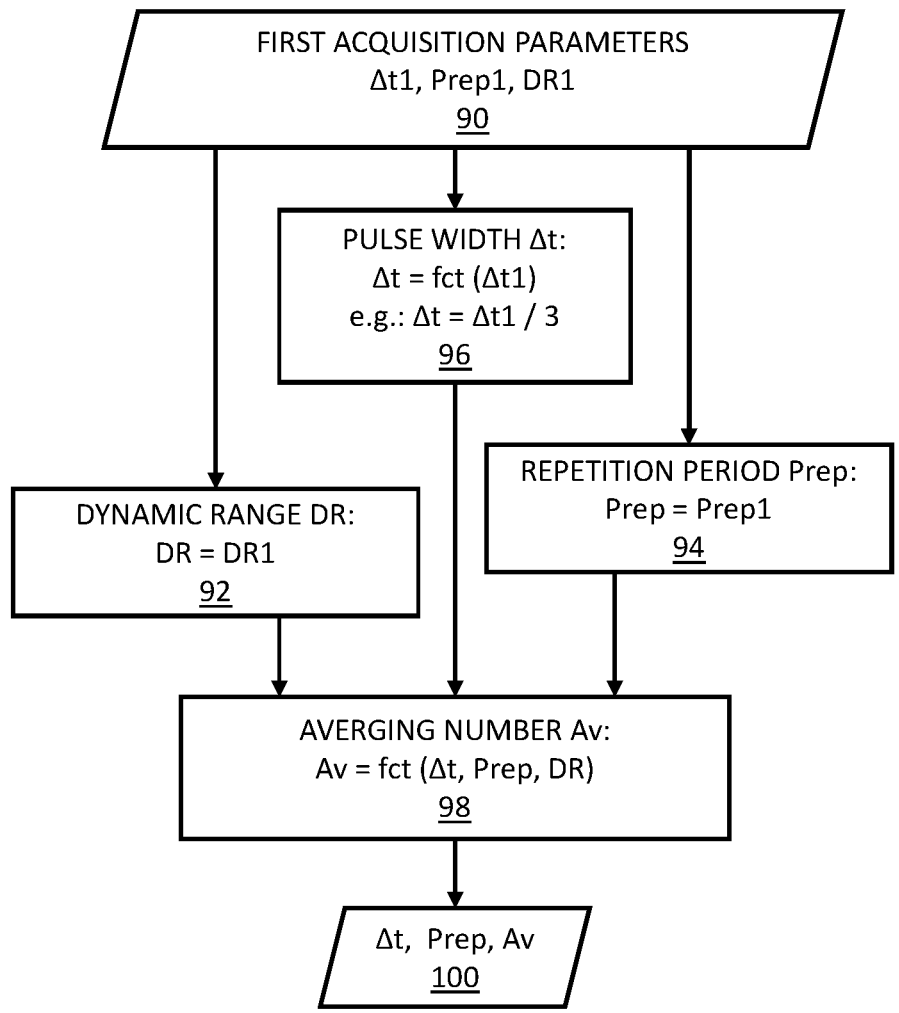
FIG. 5C is a flow chart illustrating steps of a method for selecting OTDR acquisition parameters to investigate a target event, in accordance with third embodiment.

In another embodiment, values of the new set of OTDR acquisition parameters are determined at least as a function of the acquisition parameters used in step 12 (see FIG. 5C). The new set of OTDR acquisition parameters are then selected with the goal of improving the spatial resolution compared to the first OTDR acquisition(s) by selecting a shorter pulse width along with a greater averaging number and consequently a longer acquisition time.

In step 24, at least one OTDR acquisition is performed toward the optical fiber link to be tested, using the new set of OTDR acquisition parameters determined in step 22.

Optionally, the event-specific OTDR measurement of steps 22 and 24 may comprise more than one OTDR acquisitions performed with different sets of OTDR acquisition parameters. For example, for reflective events, a second acquisition with a greater spatial resolution but a lower dynamic range may be used to better distinguish the merged events inside the potential faults even though such acquisition may not be usable to determine a value of insertion loss associated with each merged events.

Figure 1B:
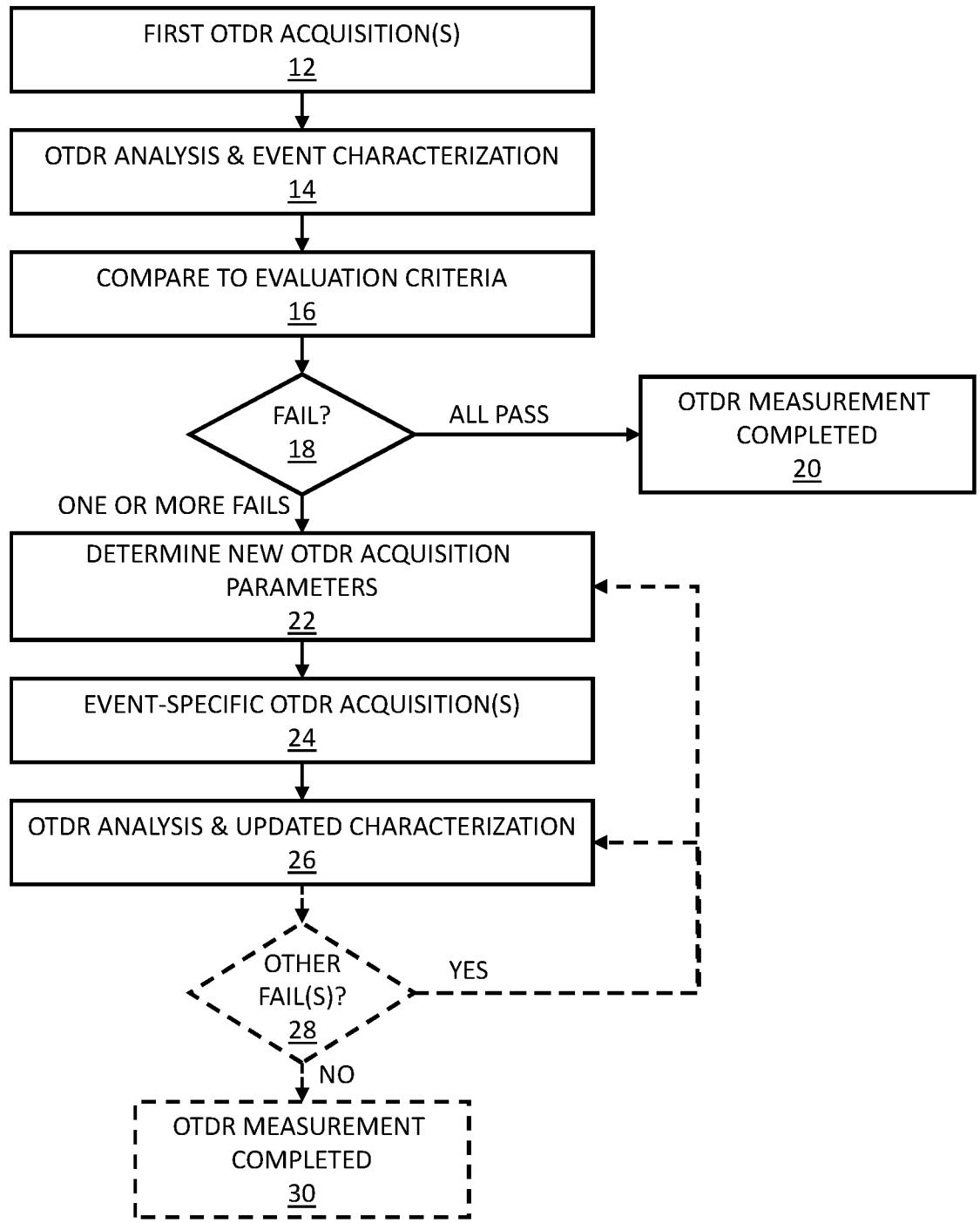
FIG. 1B is a flow chart illustrating an OTDR method for characterizing an optical fiber link, in accordance with one embodiment.

FIG. 1B is a flow chart illustrating an example OTDR method for characterizing an optical fiber link which uses the method of FIG. 1A. The OTDR method that can be fast (e.g. faster than multi-pulse measurements) when the optical fiber link under test shows no fault (no bad connector, bad splice or macrobend), while spending more time to investigate when faults are identified, in order to attempt to eliminate false faults that may be caused by merged events.

In steps 12 and 14, a fast OTDR measurement is conducted on the optical fiber link.

First, in step 12, a first set of one or more OTDR acquisition(s) is performed toward the optical fiber link to be tested. In one embodiment, a single OTDR acquisition is performed using, e.g., preconfigured or predetermined acquisition parameters that are selected to cover a given maximum distance and loss range for an optical fiber link (e.g., 40 km and 15 dB). In other embodiments, a set of OTDR acquisitions are performed using a set of different acquisition parameters such as different pulse widths or different wavelengths. However, the goal of this fast OTDR measurement is to limit the acquisition time. OTDR acquisition time can be minimized by the use of a greater pulse width, which increase the level of backscattered signal received from the optical fiber link under test and thereby minimizes the required acquisition time for a given dynamic range requirement. For example, acquisition time of 300 ms or between 200 ms and 500 ms may be used.

The number of OTDR acquisition in the set of OTDR acquisitions may depend on the distance range and the loss range to cover (e.g. 40 km and 15 dB), but the total acquisition time is generally limited to a maximum of few seconds (e.g., 2 to 3 seconds).

Optionally, the distance range and loss range to cover may be obtained by performing a preliminary OTDR acquisition that allows to estimate the link length. This optional step may help to optimize the acquisition parameters for the optical fiber link to be tested. For example, the approximate link length can be obtained from a preliminary OTDR acquisition, which may then be used to determine the repetition rate to be applied in subsequent OTDR acquisition(s).

In step 14, an OTDR analysis is conducted from the OTDR acquisitions obtained from step 12 in order to identify events along the optical fiber link, including the end of the optical fiber link, and provide a detailed characterization of the identified events.

Figure 2:
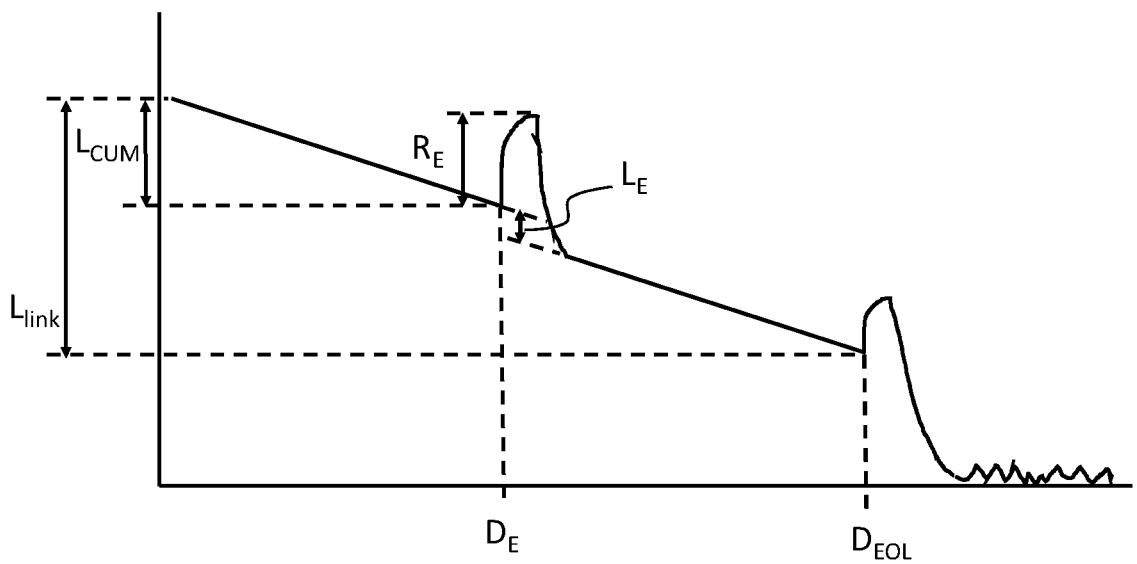
FIG. 2 is a graph illustrating an example of an OTDR acquisition showing a characteristics associated with an identified event.

Referring to FIG. 2 which shows an example of an OTDR trace obtained from step 12. The OTDR trace shows an event E identified along the optical fiber link, which is characterized in terms of location $D_E$, insertion loss $L_E$ and reflectance $R_E$ characteristics. The event E may further be characterized in term of a cumulated loss $L_{CUM}$ from the beginning of the link up to the event. The OTDR trace also allows determination of the location $D_{EOL}$ of the end of the optical fiber link and the total link loss $L_{link}$.

Optionally, the fast OTDR measurement may comprise an additional step (not shown) of conducting an additional OTDR acquisition performed with a shorter pulse width and a slightly longer acquisition time (e.g., 2 sec) in order to specifically cover the end of the optical fiber link with a higher spatial resolution and detect potential hidden faults at the end of link. A dynamic range requirement associated with such additional OTDR acquisition may be relaxed by taking into account a total link length and insertion loss as determined in step 14, thereby allowing the use of a smaller pulse width.

Back to FIG. 1B, the outcome of the fast OTDR measurement may be a list of events associated with estimated values of corresponding characteristics, such as location $D_E$, insertion loss $L_E$ and reflectance $R_E$.

In step 16, the determined characteristics are compared to established evaluation criteria in order to determine if the characteristics are acceptable, e.g. in accordance with given thresholds. For example, the evaluation criteria may comprise PASS/FAIL thresholds and step 16 may comprise determining a pass/fail status associated with each event by comparing the estimated values of characteristics to the PASS/FAIL thresholds. In some embodiments, the established thresholds may depend on the type of event identified. For example, the insertion loss threshold for non-reflective events may be set to 0.3 dB, and be set to 0.7 dB for reflective events. Accordingly, if a non-reflective event E is identified and an associated value of insertion loss $L_E$ is found to exceed the insertion loss threshold (e.g., 0.3 dB), the event E is marked as a potential fault (e.g. FAIL) because it does not meet one evaluation criterion. Of course, the value of reflectance $R_E$ associated with a reflective event may similarly be compared to an established reflectance threshold to determine if the event meets the evaluation criteria, e.g., the PASS/FAIL thresholds. Whenever one characteristic of an event does not meet the associated evaluation criterion, the event is identified as a potential fault.

Of course, any optional additional OTDR acquisition performed in steps 12 and 14 to specifically cover the end of the fiber may be analyzed in step 16 to detect potential faults close to the far end connector.

In decision box 18, if according to step 16, all events identified along the optical fiber link meet the evaluation criteria, e.g., all determined characteristics are below the applicable PASS/FAIL thresholds, then in step 20, the OTDR measurement is completed and the OTDR measurement results may be saved in memory, displayed or otherwise output or made available. The optical fiber link under test is deemed to be acceptable such that there is no need for any further investigation. The OTDR measurement was therefore completed and it can be confirmed that there is no defect along the optical fiber link and this, within a very short acquisition time, e.g., in less than 500 ms.

However, in decision box 18, more investigation is required if one or more event identified along the optical fiber link does not meet the evaluation criteria, i.e. one or more event is identified as a potential fault.

It will be understood that the OTDR acquisition parameters for the fast OTDR measurement are selected to cover the dynamic range required by the optical fiber link under test with a short acquisition time. As such, the selected pulse width for the fast OTDR measurement may be relatively long, with a low associated spatial resolution. The fast OTDR measurement therefore tend to hide events that are too close from one another, referred to herein as a group of merged events, or simply merged events.

Therefore, in some cases, two or more events along the link under test may not be individually distinguishable in the initial fast OTDR measurement and appear as merged such that it may even be impossible to identify that there actually are multiple events on what appear like a single one. In this case, respective characteristics of the merged events cannot be properly assessed, and a pass/fail status associated with the merged events may wrongly indicate a FAIL result, also referred to herein as a false FAIL result.

Therefore, if (and optionally only if) a FAIL result is obtained for an event (corresponding to a potential fault), a further investigation is conducted to attempt to eliminate potential false FAIL results. In this case, an event-specific OTDR measurement is carried out in steps 22, 24 and 26, to inspect the faulty event (referred to herein as the "target event"), using OTDR acquisition parameters that are selected to "optimally" inspect a target event. Increasing the spatial resolution to further investigate any potential fault may reveal events that were merged in the initial fast OTDR measurement, to which evaluation criteria may be better applied to eliminate potential false FAIL results.

In step 22, values for a new set of OTDR acquisition parameters are determined for conducting an event-specific OTDR measurement. The new set of OTDR acquisition parameters to be determined may comprise a pulse width $\Delta t$, a pulse repetition period $P_{rep}$, an averaging number Av, an acquisition time T and/or any other parameter that is being set by the OTDR device for performing an OTDR acquisition.

In one embodiment, values of the new set of OTDR acquisition parameters are determined at least as a function of one characteristic of the target event (see FIGS. 5A and 5B). The new set of OTDR acquisition parameters may be determined as of function of one or more of the location $D_E$ of the target event E, the insertion loss $L_E$ of the target event E, the reflectance $R_E$ of the target event E, the cumulated loss $L_{CUM}$ before the target event E, and the location $D_{EOL}$ of the end of the optical fiber link.

Furthermore, the new set of OTDR acquisition parameters may be determined to satisfy an allowed acquisition time (e.g., 2 to 15 sec) and a dynamic range sufficient to characterize the target event. Step 22 may determine acquisition parameters that satisfy these requirements while maximizing the spatial resolution.

In another embodiment, values of the new set of OTDR acquisition parameters are determined at least as a function of the acquisition parameters used in step 12 (see FIG. 5C). The new set of OTDR acquisition parameters are then selected with the goal of improving the spatial resolution compared to the first OTDR acquisition(s) by selecting a shorter pulse width along with a greater averaging number and consequently a longer acquisition time.

The new set of OTDR acquisition parameters may be selected to increase the spatial resolution compared to the initial fast OTDR measurement, in order to distinguish potential merged events. Because the OTDR acquisition is meant to specifically investigate the target event, there is no need for the event-specific OTDR measurement to provide a dynamic range that reaches the end of the optical fiber link. Exemplary methods for selecting OTDR acquisition parameters to investigate a target event are described hereinbelow with reference to FIGS. 5A, 5B and 5C.

In step 24, at least one OTDR acquisition is performed toward the optical fiber link to be tested, using the new set of OTDR acquisition parameters determined in step 22.

Optionally, the event-specific OTDR measurement of steps 22 and 24 may comprise more than one OTDR acquisitions performed with different sets of OTDR acquisition parameters. For example, for reflective events, a second acquisition with a greater spatial resolution but a lower dynamic range may be used to better distinguish the merged events inside the potential faults even though such acquisition may not be usable to determine a value of insertion loss associated with each merged events.

In step 26, an OTDR analysis is conducted from the OTDR acquisitions obtained from step 24 in order to derive values of at least one characteristic of any merged events associated with the target event or derive updated values of at least one characteristic of the target event. From step 26, it may be determined if the target event is a real fault or if it corresponds to merged events. Step 26 may also compare the determined characteristics of any now unmerged events with the established evaluation criteria in order to determine if the characteristics are acceptable, e.g., in accordance with given PASS/FAIL thresholds.

In one embodiment, if more than one event is revealed (the unmerged events) and insertion loss values can be determined on the unmerged events, the determined characteristics can be compared with the established evaluation criteria in order to determine if the characteristics are acceptable. However, if the event-specific OTDR measurement reveals more than one unmerged events but the individual insertion losses are not measurable due to insufficient spatial resolution, the evaluation criteria may optionally be applied to the group of events associated with the target event by comparing the total insertion loss of the group with a sum of the individual threshold values for with each events of the group. If the event-specific OTDR measurement does not reveal any merged events (a single event is seen), updated values of characteristics associated with the target event may be compared to the established evaluation criteria.

In some embodiments, the OTDR analysis of step 26 may update the characterization of all events identified along the optical fiber link, whereas in other embodiments, only the target event and/or the unmerged events are analyzed. All events may be assessed (within spatial resolution limits of the given OTDR method and device) and the OTDR measurement results be final.

Then in step 30, the OTDR measurement is completed and the OTDR measurements may be saved in memory, displayed or otherwise output or made available.

Optionally, in step 28, the analysis of step 26 may be repeated for other target events if other potential faults were identified in step 16. A further event-specific OTDR measurement may also be performed to target any other potential fault(s) identified in step 16.

Figure 3:
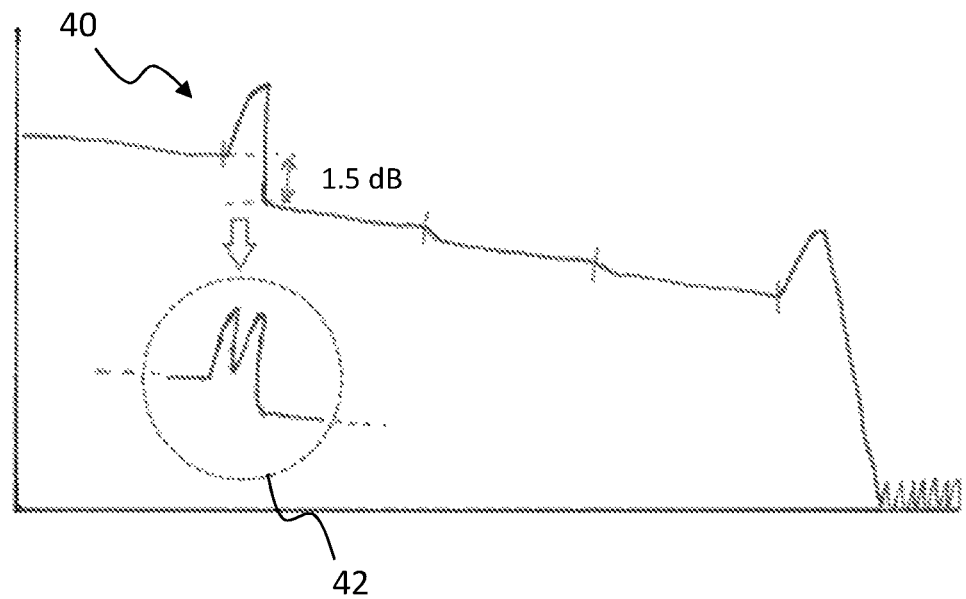
FIG. 3 is a graph illustrating an example of a first OTDR acquisition showing a target event comprising merged reflective events and a second OTDR acquisition showing the merged reflective events unmerged.

FIG. 3 illustrates an example of an OTDR trace 40 obtained from a fast OTDR measurement and showing a target event comprising merged reflective events. FIG. 3 also illustrates an OTDR trace 42 obtained from an event-specific OTDR measurement and revealing two reflective events. Although individual insertion loss values cannot be properly derived from OTDR trace 42, the revealed presence of two events may be used to modify the evaluation criteria. For example, the total insertion loss of the group of events may be compared with a sum of the individual threshold values associated with each events of the group.

Figure 4:
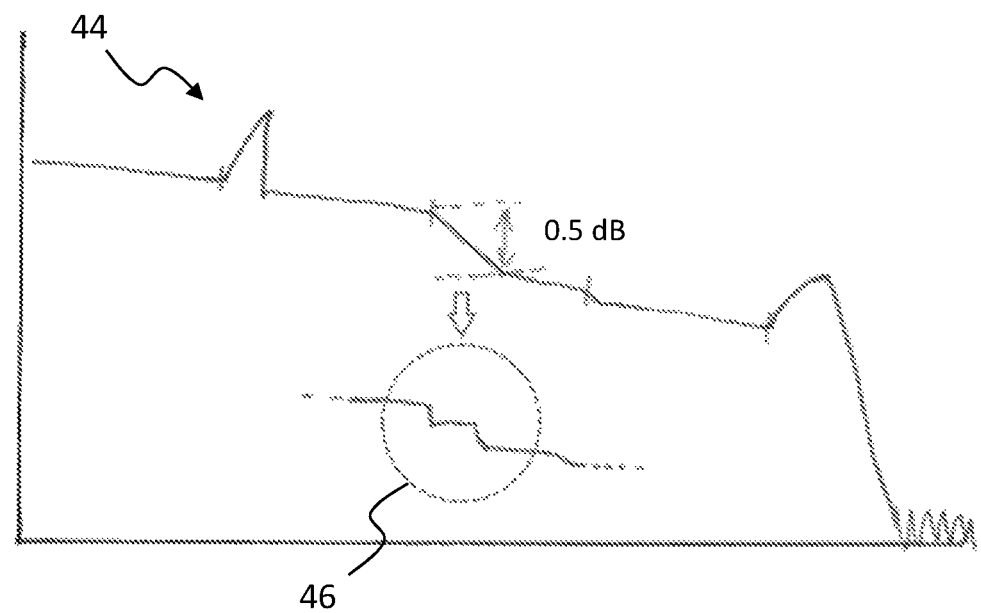
FIG. 4 is a graph illustrating an example of a first OTDR acquisition showing a target event comprising merged non-reflective events and a second OTDR acquisition showing the merged non-reflective events unmerged.

FIG. 4 illustrates an example of an OTDR trace 44 obtained from a fast OTDR measurement and showing a target event which appears as a single event but actually comprises merged non-reflective events. The insertion loss of the merged events cumulates to 0.5 dB in the apparent single event, which exceeds the example insertion loss threshold of, e.g., 0.3 dB for non-reflective events. Such an insertion loss would generate a false FAIL result. FIG. 4 also illustrates an OTDR trace 46 obtained from an event-specific OTDR measurement and revealing two unmerged non-reflective events. In this case, updated values of insertion loss can be properly derived from OTDR trace 46 for each unmerged event, and then compared with the evaluation criteria to assess the optical fiber link. For example, the insertion loss values of the unmerged events may be 0.25 dB, which are below the insertion loss threshold and yield a PASS status.

In another example (not illustrated), a target event E may first be identified as a non-reflective event in step 16 (reflectance value $R_E$ is low or null) and an associated value of insertion loss $L_E$ found to exceed the insertion loss threshold of, e.g., 0.3 dB for non-reflective events. The event E is then marked as a potential fault (FAIL) because it does not meet one evaluation criterion. However, long pulses may tend to hide a connector reflectance. If the analysis of step 26 conducted from the second OTDR acquisition(s) then reveals that the event E is a reflective event, a different insertion loss threshold of, e.g., 0.7 dB for reflective events may be applied and event E be found to generate a PASS result.

FIGS. 5A, 5B and 5C illustrate exemplary methods for selecting OTDR acquisition parameters to investigate a target event. The methods of FIGS. 5A, 5B and 5C constitute some possible implementations of step 22 of FIG. 1 and one skilled in the art will be able to devise variants as well as other implementations not described herein.

The method of FIG. 5A determines a set of OTDR acquisition parameters for conducting the event-specific OTDR measurement. In this implementation, values of the new set of OTDR acquisition parameters are determined as a function of the insertion loss $L_E$ of the target event E, the cumulated loss $L_{CUM}$ before the target event E (or the cumulated loss after the target event E ($L_E+L_{CUM}$)), the location $D_{EOL}$ of the end of the optical fiber link, a signal-to-noise ratio requirement SNR and a maximum allowed acquisition time T. It is noted that in other implementations, values of the new set of OTDR acquisition parameters may be determined as a function of other characteristics of the target event including, e.g., the reflectance $R_E$ and/or the location $D_E$, and/or other characteristics measurement parameters.

The method receives in step 50, values determined from a prior fast OTDR measurement, including values of event insertion loss $L_E$, cumulated loss $L_{CUM}$ and end of link location $D_{EOL}$. In step 52, a value of signal-to-noise ratio requirement SNR is received. For example, this value may be preset as a fixed value or preconfigured for a given OTDR device. In step 54, a value of maximum allowed time T for the event-specific acquisition is received. The signal-to-noise ratio requirement and the maximum allowed acquisition time T may be predetermined or provided, e.g., via configuration parameters.

In step 56, the dynamic range DR required in an OTDR acquisition to allow characterization of the target event is determined from the event insertion loss LE, the cumulated loss $L_{CUM}$ and the signal-to-noise ratio requirement SNR. The required dynamic range DR is determined as the sum of these values:

$$DR \geq L_E + L_{CUM} + SNR$$

It will be understood that instead of providing separate values of event insertion loss $L_E$ and the cumulated loss $L_{CUM}$, it is equivalent to provide a single value of cumulated loss after the target event ($L_E+L_{CUM}$) and determine the required dynamic range DR therefrom. Of course, other methods may be used for calculating the required dynamic range, including, e.g., the method described herein below for step 78 of the method of FIG. 5B.

In step 58, the minimum value of a repetition period $P_{rep}$ for the pulsed test signal is determined, as known in the art, as a function of the location $D_{EOL}$ of the end of the link. More specifically, the repetition period $P_{rep}$ may be determined as the minimum repetition period that can be used while avoiding ghost pulses:

$$Prep \geq 2 \cdot D_{EOL} = c/n_{eff}$$

where $c/n_{eff}$ corresponds to the speed of light in the optical fiber link. In other embodiments, a safe repetition period may be determined from twice a round trip to the end of link to make sure that any echo arising from a reflectance at the end of the link has enough time to return:

$$Prep \geq 2 \cdot 2 \cdot D_{EOL} = c/n_{eff}$$

In yet other embodiments, the minimum value of the repetition period $P_{rep}$ may be determined by examining the attenuation of the return light signal on the prior fast OTDR acquisition to determine the distance of the end of the return light signal $D_{EOS}$, which may be longer than detected end of link $D_{EOL}$. $P_{rep}$ may then be determined as:

$$Prep \geq 2 \cdot D_{EOS} \div c/n_{eff}$$

In step 60, the averaging number Av, i.e. the number of repetition periods, is determined as a function of the determined repetition period Prep and the maximum allowed acquisition time T so as to maximize the averaging number Av while keeping the acquisition time below the maximum allowed:

$$Av \leq T/Prep$$

In step 62, the pulse width $\Delta t$ is determined as a function of the required dynamic range DR and the averaging number Av. The determination may be based, e.g., on a theoretical or prior dynamic range DR characterization of the OTDR device which defines the dynamic range DR of an OTDR trace as a function of the pulse width $\Delta t$ and averaging number Av. The dynamic range DR characterization may be provided, e.g., in the form of a table or an algebraic function. The pulse width $\Delta t$ may then be selected as the smallest pulse width $\Delta t$ that can provide the required dynamic range DR for the determined averaging number Av.

In step 64, the selected pulse width $\Delta t$ and repetition period $P_{rep}$ or averaging number Av are output or otherwise made available to the OTDR acquisition device for performing the event-specific OTDR acquisition.

It is noted that the method of FIG. 5A is one possible implementation of step 22 of FIG. 1. For example, in other implementations, steps 60 and 62 may be replaced by a single step that more generally determines the pulse width $\Delta t$ as a function of the required dynamic range DR, the maximum acquisition time T and the required repetition period Prep. In some OTDR systems, the averaging number Av for a determined acquisition time T may vary with the pulse width. In such cases, the pulse width $\Delta t$ may be selected as the smallest pulse width that can provide the required dynamic range DR for the required repetition period Prep and the maximum acquisition time T.

The method of FIG. 5B represents another possible implementation of step 22 of FIG. 1, to determine a set of OTDR acquisition parameters for conducting the event-specific OTDR measurement. In this implementation, values of the new set of OTDR acquisition parameters are determined as a function of the insertion loss $L_E$ of the target event E, the cumulated loss $L_{CUM}$ before the target event E (or the cumulated loss after the target event E ($L_E+L_{CUM}$)), the repetition period Prep1 used in a first OTDR acquisition of step 12 and a maximum allowed acquisition time T.

The method receives in step 70, values determined from a prior fast OTDR measurement, including values of event insertion loss $L_E$ and cumulated loss $L_{CUM}$. In step 72, a value of the repetition period Prep1 used in the first OTDR acquisition is received. In step 74, a value of maximum allowed time T for the event-specific acquisition is received. The maximum allowed acquisition time T may be predetermined or provided, e.g., via configuration parameters.

In step 76, a value of the required signal-to-noise ratio SNR is determined. The SNR may be determined, e.g., as a function of the insertion loss $L_E$ of the target event E. The SNR may then be determined so as to be good enough for an OTDR trace to properly reveal and measure an insertion loss corresponding to $L_E$, such that a greater value of SNR is selected for lower values of inversion loss $L_E$ and a lower value of SNR for greater values of inversion loss $L_E$ (e.g., SNR=12 dB when $L_E$<0.5 dB and SNR=9 dB when $L_E$≥0.5 dB). Optionally, the value of insertion loss $L_E$ (capped to a constant value such as 3 dB) may be added:

$$SNR=(9 \text{ or } 12 \text{ dB})+\min(3 \text{ dB}, L_E)$$

Of course, other methods may be used to determine the required SNR. For example, the required SNR may be preset as a fixed value or preconfigured for a given OTDR device.

In step 78, the required dynamic range $DR_r$ to allow characterization of the target event is determined from the cumulated loss $L_{CUM}$ and the required signal-to-noise ratio SNR. The required dynamic range DR is determined from the sum of these values as:

$$DR \geq K + L_{CUM} + SNR$$

where K is a constant that may be preset as a fixed value or preconfigured (e.g., K=3 dB).

In step 80, the repetition period $P_{rep}$ for the pulsed test signal is determined to correspond to the repetition period $P_{rep1}$ used in the first OTDR acquisition. Although not necessarily optimal for the given optical fiber link under test, the first OTDR acquisition is known to be appropriate to avoid ghost pulses and may therefore be used for the event-specific OTDR acquisition(s).

In step 82, the pulse width Δt is determined as a function of the required dynamic range $DR_r$, maximum allowed acquisition time T and the repetition period Prep. The determination may be based, e.g., on a theoretical or prior dynamic range DR characterization of the OTDR device which defines the dynamic range DR of an OTDR trace as a function of the pulse width Δt, the maximum allowed acquisition time T and the repetition period Prep. The dynamic range DR characterization may be provided, e.g., in the form of a table or an algebraic function. The pulse width Δt may then be selected as the smallest pulse width Δt that can provide the required dynamic range DR for the maximum allowed acquisition time T and the determined repetition period Prep.

In step 84, the averaging number Av, i.e. the number of repetition periods, is determined. The averaging number Av may directly derive from the characterization used in step 82 or be determined as a function of the determined repetition period Prep and the maximum allowed acquisition time T so as to maximize the averaging number Av while keeping the acquisition time below the maximum allowed:

$$Av \leq T/Prep.$$

In step 86, the selected pulse width Δt and repetition period $P_{rep}$ or averaging number Av are output or otherwise made available to the OTDR acquisition device for performing the event-specific OTDR acquisition.

The method of FIG. 5C represents yet another possible implementation of step 22 of FIG. 1, to determine a set of OTDR acquisition parameters for conducting the event-specific OTDR measurement. In this implementation, values of the new set of OTDR acquisition parameters are determined at least as a function of first acquisition parameters used for a prior fast OTDR measurement. These values for the new set of OTDR acquisition parameters may be determined as a function of the pulse width Δt1 and the repetition period $P_{rep1}$ used for the prior fast OTDR measurement, as well as the dynamic range DR1 corresponding to these first OTDR acquisition parameters.

In the method of FIG. 5C, the new set of OTDR acquisition parameters are selected to improve the spatial resolution compared to the prior fast OTDR measurement by selecting a shorter pulse width Δt and a longer acquisition time T.

In step 90, values of some first acquisition parameters used for the prior fast OTDR measurement are received, including values of the pulse width Δt1 and the repetition period $P_{rep}1$, as well as well as the dynamic range DR1 corresponding to these first OTDR acquisition parameters.

In step 92, the target dynamic range DR for the event-specific OTDR acquisition is determined to correspond to the dynamic range DR1 corresponding to the first OTDR acquisition.

In step 94, the repetition period $P_{rep}$ for the pulsed test signal is determined to correspond to the repetition period $P_{rep1}$ used in the first OTDR acquisition.

In step 96, the pulse width Δt is determined as a function the pulse width Δt1 used in the first OTDR acquisition. The pulse width Δt is determined to be shorter than the pulse width Δt1, so as to improve the spatial resolution compared to the prior fast OTDR measurement. For example, the pulse width Δt may be determined as a predetermined fraction of the pulse width Δt1, such as a third of the pulse width Δt1, for example:

$$\Delta t = \Delta t1/3$$

Of course, other ratios may be used such as 2, 4, 5 etc.

In step 98, the averaging number Av, i.e. the number of repetition periods, is determined as the required averaging number Av for obtaining the dynamic range DR with the determined pulse width Δt and repetition period Prep. For example, the determination may be based, e.g., on a theoretical or prior dynamic range DR characterization of the OTDR device which defines the dynamic range DR of an OTDR trace as a function of the pulse width Δt, the averaging number Av and the repetition period Prep.

It is noted that the acquisition time T, the averaging number Av and the repetition period Prep are interrelated values. Therefore, alternatively, the acquisition time T may be determined in step 98 instead of the averaging number Av.

In step 100, the selected pulse width Δt, repetition period $P_{rep}$ and averaging number Av (or acquisition time T) are output or otherwise made available to the OTDR acquisition device for performing the event-specific OTDR acquisition.

Figure 6:
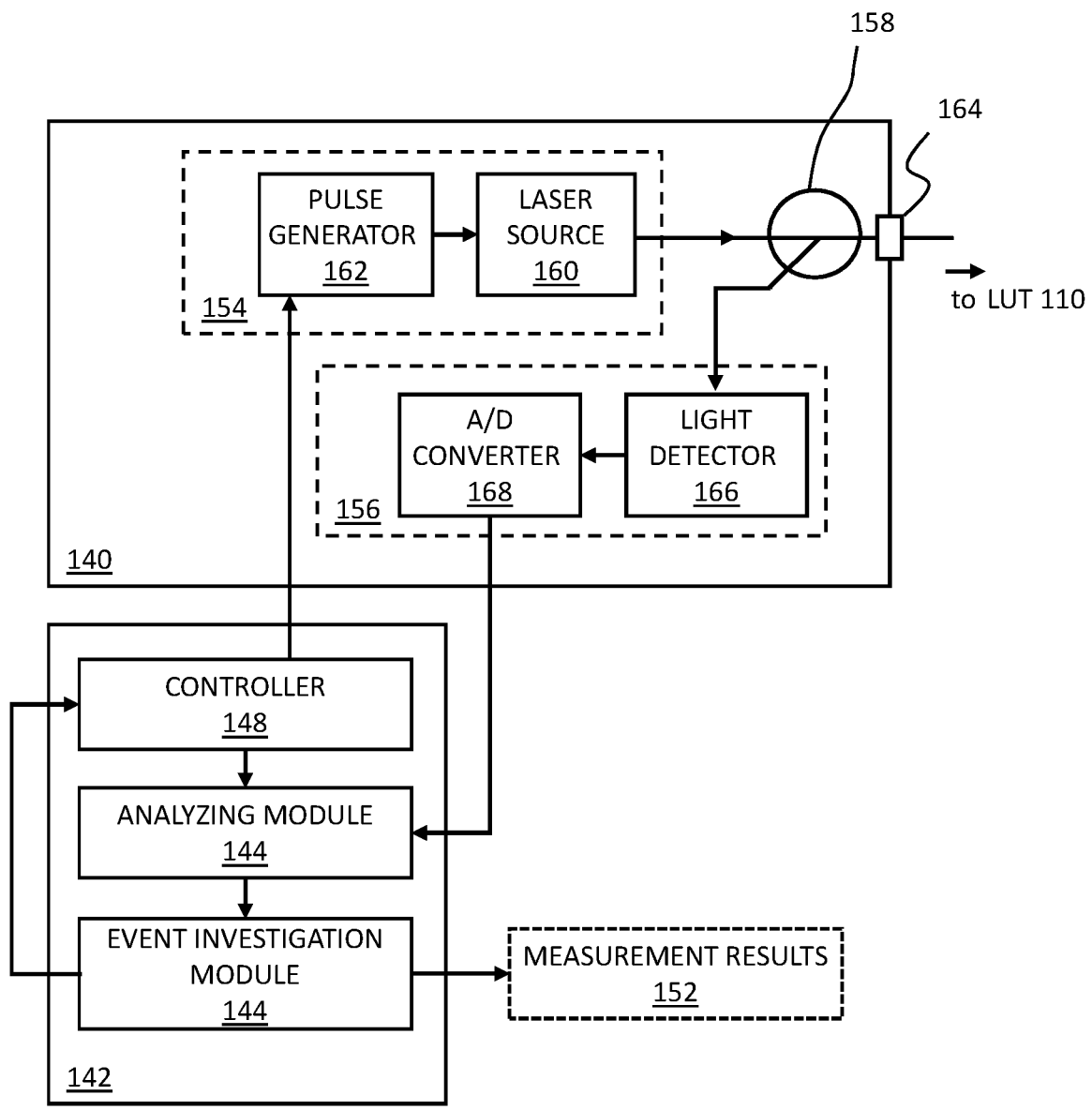
FIG. 6 is a block diagram showing an example embodiment of an OTDR device for implementing the OTDR method of FIG. 1.

FIG. 6 shows an embodiment of an OTDR device 100 for use in the OTDR method of FIG. 1 to characterize an optical fiber link 110 comprising one or more events E therealong.

The OTDR device 100 comprises an OTDR acquisition device 140 connectable toward the tested optical fiber link 110 via an output interface 164, for performing OTDR acquisitions toward the optical fiber link 110. The OTDR acquisition device 140 comprises conventional optical hardware and electronics as known in the art for performing OTDR acquisitions on an optical fiber link.

The OTDR device 100 further comprises one or more processing unit 142 configured to analyze OTDR traces obtained by the OTDR acquisition device 140 to obtain therefrom an OTDR measurement and/or determining values of one or more OTDR acquisition parameters for at least one OTDR acquisition. The one or more processing unit 142 may comprise one or more processors.

The processing unit 142 may embody an analyzing module 144 configured to identify and characterize one or more events along the optical fiber link through a proper analysis of acquired OTDR trace(s). The events are typically characterized in terms of location, insertion loss and reflectance characteristics while optical fiber segments may be characterized in terms of length and attenuation parameters. The analyzing module 144 may be embodied by an analyzing software that performs the calculations necessary to characterize events along one of the optical fiber link 110. The analyzing software identifies and characterizes events along the optical fiber link 110 through analysis of one or more OTDR traces. In one embodiment, the analyzing software performs steps 14, 16, 26 of the method of FIG. 1 described hereinabove and may identify a target event which requires further investigation.

The processing unit 142 may further embody an event-investigation module 146 configured for determining values of one or more OTDR acquisition parameters for at least one event-specific OTDR acquisition to be performed toward the optical fiber link. The event-investigation module 146 may be embodied by an event-investigation software that performs the calculations necessary to determine OTDR acquisition parameters. In one embodiment, the event-investigation software performs step 22 of the method of FIG. 1 described hereinabove.

The analyzing module 144 and the event-investigation module 146, may be made integral 146, partially external or totally external to the OTDR device 100 used to perform the acquisitions.

The processing unit 142 may further embody a controller 148 configured to control the OTDR acquisition device 140 to launch OTDR acquisitions in accordance with determined OTDR acquisition parameters. The controller 146 may be embodied by a controller software and may be employed to perform steps 18 and 28 of the method of FIG. 1 described hereinabove.

The OTDR acquisition device 140 comprises a light generating assembly 154, a detection assembly 156 and a directional coupler 158.

The light generating assembly 154 is embodied by a laser 160 driven by a pulse generator 162 to generate the test signal comprising test light pulses having desired characteristics. As known in the art, the light generating assembly 154 is adapted to generate test light pulses of varied pulse widths, repetition periods and optical power through a proper control of the pattern produced by the pulse generator 162. One skilled in the art will understand that it may be beneficial or required by the application to perform OTDR measurements at various different wavelengths. For this purpose, in some embodiments, the light generating assembly 154 is adapted to generate test light pulses having varied wavelengths by employing a laser 160 that is tunable for example. It will be understood that the light generating assembly 154 may combine both pulse width and wavelength controlling capabilities. Of course, different and/or additional components may be provided in the light generating assembly, such as modulators, lenses, mirrors, optical filters, wavelength selectors and the like.

The light generating assembly 154 is coupled to the output interface 164 of the OTDR acquisition device 140 through a directional coupler 158, such as a circulator, having three or more ports. The first port is connected to the light generating assembly 154 to receive the test light pulses therefrom. The second port is connected toward the output interface 164. The third port is connected to the detecting assembly 156. The connections are such that test light pulses generated by the light generating assembly 154 are coupled to the output interface 164 and that the return light signal arising from backscattering and reflections along the optical fiber link 110 is coupled to the detection assembly 156.

The detection assembly 156 comprises a light detector 166, such as a photodiode, an avalanche photodiode or any other suitable photodetector, which detects the return light signal corresponding to each test light pulse, and a converter 168 to convert the electrical signal proportional to the detected return light signal from analog to digital in order to allow processing by the processing unit 142. It will be understood that the detected return light signal may of course be amplified, filtered or otherwise processed before analog to digital conversion. The power level of return light signal as a function of time, which is obtained from the detection and conversion above, is referred to as one acquisition of an OTDR trace. One skilled in the art will readily understand that in the context of OTDR methods and systems, each light acquisition generally involves propagating a large number of substantially identical light pulses in the optical fiber link and averaging the results, in order to improve the Signal-to-Noise Ratio (SNR). In this case, the result obtained from averaging is herein referred to as an OTDR trace. It will also be understood that other factors may need to be controlled during the light acquisitions or from one light acquisition to the next, such as gain settings, pulse power, etc. as is well known to those skilled in the art.

Of course, the OTDR acquisition device 140 may also be used to perform multiple acquisitions with varied pulse widths to obtain a multi-pulsewidth OTDR measurement. The thereby obtained OTDR traces will be typically stored in memory (not shown) for further processing. In one embodiment, the OTDR acquisition device 140 performs steps 12 and 24 of the method of FIG. 1 described hereinabove.

The controller 148 is used to control the acquisition conditions for each light acquisition, by controlling the light generating assembly 154 to generate test light pulses having variable pulse widths, repetition periods, wavelengths and/or optical power.

The OTDR traces acquired from the optical fiber link 110 are received and analyzed by the processing unit 142.

The described systems and methods may also involve performing additional light acquisitions under varying acquisition conditions. For example, the systems and methods described herein may further employ multi-pulsewidth bi-directional OTDR analysis, as described in US Application Publication no. US2014/0198311A1 to L'Heureux et al. dated Jul. 17, 2014 and which is commonly owned by Applicant and hereby incorporated by reference.

Figure 7:
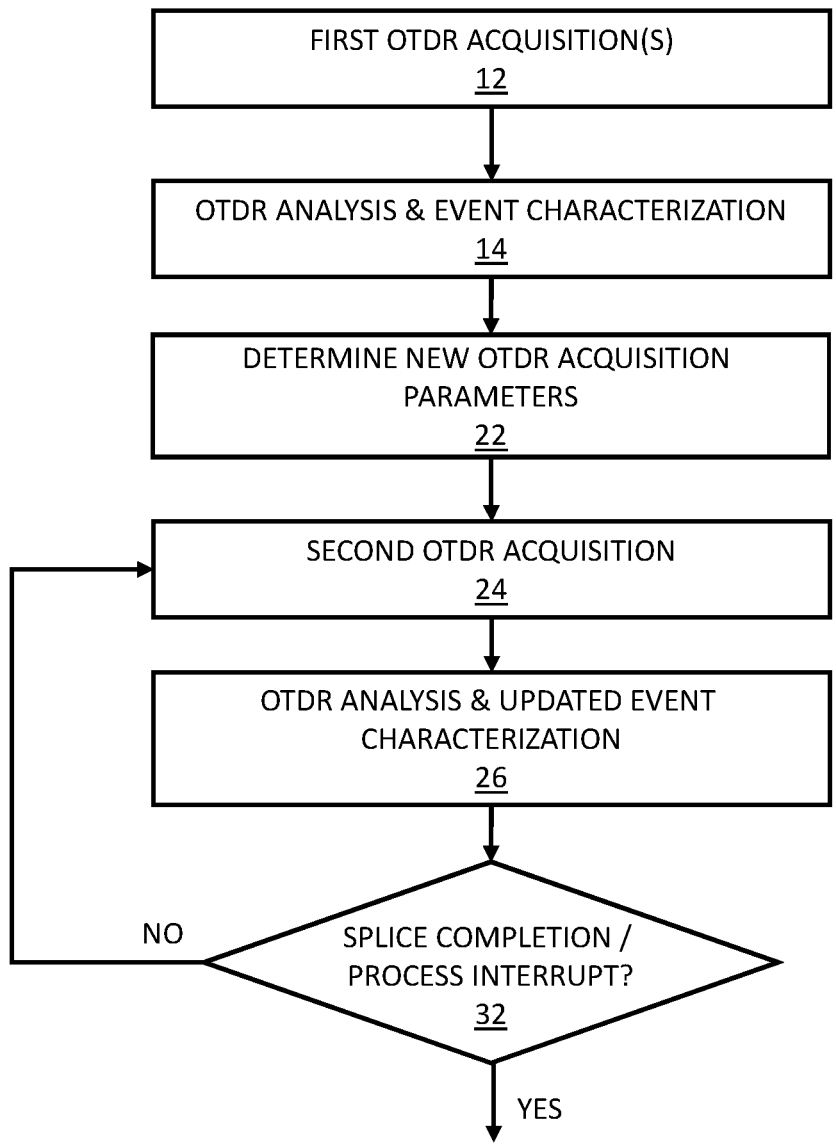
FIG. 7 is a flow chart illustrating an OTDR method for monitoring an optical fiber splicing process, in accordance with one embodiment.

FIG. 7 is a flow chart illustrating another example OTDR method for characterizing an optical fiber link and which uses the method of FIG. 1A. The OTDR method of FIG. 7 is used to monitor an optical fiber splice. The target event E is then the remote end of the optical fiber link under test, which is to be spliced with another length of optical fiber. The OTDR method of FIG. 7 includes steps that are similar to corresponding steps of the method of FIG. 1B. For more conciseness, details of such similar steps are not be repeatedly detailed.

In steps 12 and 14, a first OTDR measurement is conducted on the (yet unspliced) optical fiber link.

First, in step 12, a first set of one or more OTDR acquisition(s) is performed toward the optical fiber link to be tested.

In step 14, an OTDR analysis is conducted from the OTDR acquisitions obtained from step 12 in order to identify events along the optical fiber link, including the end of the optical fiber link to be spliced.

In step 22, values of one or more OTDR acquisition parameters for a event-specific OTDR acquisition are determined at least as a function of one characteristic associated with the target event E, i.e. the end of the optical fiber link, for conducting an event-specific OTDR measurement. The new set of OTDR acquisition parameters to be determined may comprise a pulse width $\Delta t$, a pulse repetition period $P_{rep}$, an averaging number Av, an acquisition time T and/or any other parameter that is being set by the OTDR device for performing an OTDR acquisition. The new set of OTDR acquisition parameters may be determined as of function of one or more of the location $D_E$ of the target event E, the reflectance $R_E$ of the target event E, the cumulated loss $L_{CUM}$ before the target event E, and the location $D_{EOL}$ of the end of the optical fiber link.

Once the end of fiber is identified in step 14, the splicing process may be launched and monitored in steps 24 and 26. Once the splicing process begins, an additional length of optical fiber is added to the optical fiber link under test and the target event at location $D_E$ becomes a reflective or non-reflective event E of which the insertion loss $L_E$ and reflectance $R_E$ can be determined and monitor to monitor the splicing process.

In steps 24 and 26, OTDR acquisitions performed using the determined OTDR acquisition parameters are repeated in a continuous manner and a value of at least one characteristic (e.g. insertion loss and/or reflectance) associated with the target event E is estimated and displayed for each repeated OTDR acquisition.

In step 24, at least one OTDR acquisition is performed toward the optical fiber link to be tested, using the new set of OTDR acquisition parameters determined in step 22.

In step 26, an OTDR analysis is conducted from the OTDR acquisitions obtained from step 24 in order to derive values of at least one characteristic (e.g. insertion loss and/or reflectance) associated with the target event E (which was the end of fiber before splice). The updated values are then displayed to the user for each repeated OTDR acquisition.

Steps 24 and 26 are then repeated in a continuous manner such that a user may then monitor the splicing process by monitoring in real time at least one characteristic (e.g. insertion loss and/or reflectance) of the target event E. Completion of the splicing process can be determined from values of insertion loss $L_E$ and/or reflectance $R_E$ for the target event E.

When the user determines that the insertion loss value comes close to zero and the reflectance value drop to very low value, he knows that the splicing process is completed. In step 32, the technician can interrupt the repeated acquisitions, e.g., by hitting a "capture" button on the OTDR device, in order to save in memory the last OTDR measurement results. Optionally or alternatively, an OTDR measurement may further be launched in order to better characterize the spliced optical fiber link, including a new value of link length. In another embodiment, completion of the splicing process may be detected in software from determined values of insertion loss $L_E$ and reflectance $R_E$, and a capture and/or OTDR measurement be optionally executed upon such determination.

Optionally, when the capture process is completed, the OTDR device may revert to go back to continuous monitoring at the previous splice location. The user can go to the next fiber and wait for the splice to be completed, without further interaction with the unit.

Example of OTDR Device Architecture

Figure 8:
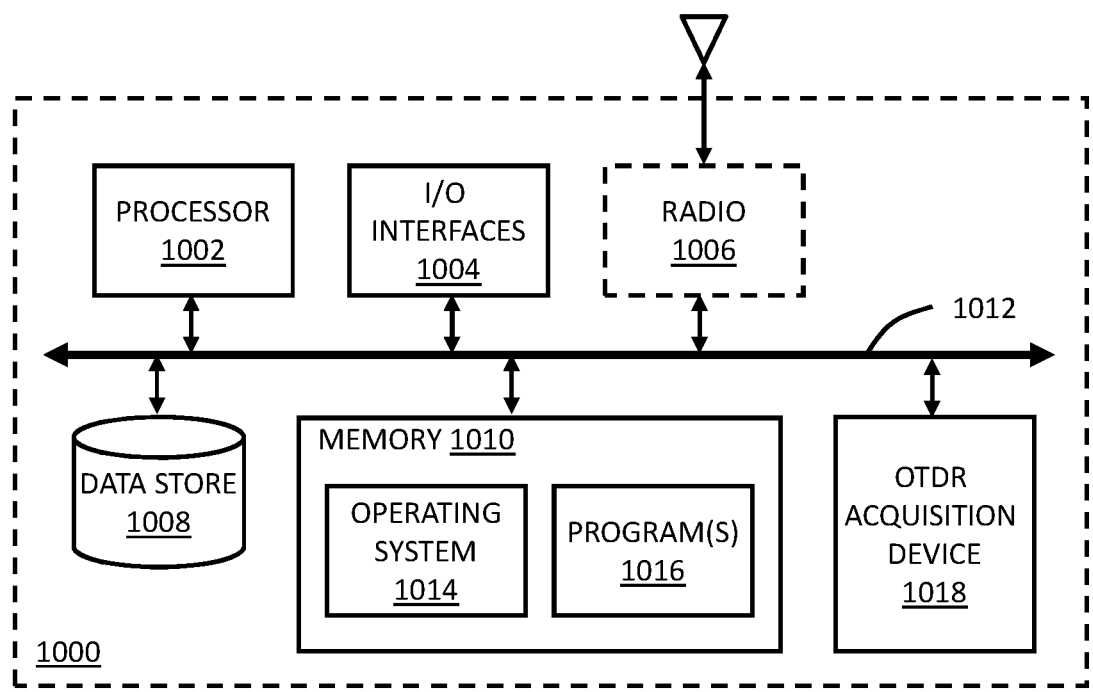
FIG. 8 is a block diagram illustrating in more details the OTDR device of FIG. 6.

FIG. 8 is a block diagram of an OTDR device 1000 which may embody the OTDR method of FIG. 1. The OTDR device 1000 may comprise a digital device that, in terms of hardware architecture, generally includes a processor 1002, input/output (I/O) interfaces 1004, an optional radio 1006, a data store 1008, a memory 1010, as well as an optical test device including an OTDR acquisition device 1018. It should be appreciated by those of ordinary skill in the art that FIG. 8 depicts the OTDR device 1000 in a simplified manner, and a practical embodiment may include additional components and suitably configured processing logic to support known or conventional operating features that are not described in detail herein. A local interface 1012 interconnects the major components. The local interface 1012 can be, for example, but not limited to, one or more buses or other wired or wireless connections, as is known in the art. The local interface 1012 can have additional elements, which are omitted for simplicity, such as controllers, buffers (caches), drivers, repeaters, and receivers, among many others, to enable communications. Further, the local interface 1012 may include address, control, and/or data connections to enable appropriate communications among the aforementioned components.

The processor 1002 is a hardware device for executing software instructions. The processor 1002 may comprise one or more processors, including central processing units (CPU), auxiliary processor(s) or generally any device for executing software instructions. When the OTDR device 1000 is in operation, the processor 1002 is configured to execute software stored within the memory 1010, to communicate data to and from the memory 1010, and to generally control operations of the OTDR device 1000 pursuant to the software instructions. In an embodiment, the processor 1002 may include an optimized mobile processor such as optimized for power consumption and mobile applications. The I/O interfaces 1004 can be used to receive user input from and/or for providing system output. User input can be provided via, for example, a keypad, a touch screen, a scroll ball, a scroll bar, buttons, barcode scanner, and the like. System output can be provided via a display device such as a liquid crystal display (LCD), touch screen, and the like, via one or more LEDs or a set of LEDs, or via one or more buzzer or beepers, etc. The I/O interfaces 1004 can be used to display a graphical user interface (GUI) that enables a user to interact with the OTDR device 1000.

The radio 1006, if included, may enable wireless communication to an external access device or network. Any number of suitable wireless data communication protocols, techniques, or methodologies can be supported by the radio 1006, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); NarrowBand Internet of Things (NB-IoT); Long Term Evolution Machine Type Communication (LTE-M); magnetic induction; satellite data communication protocols; and any other protocols for wireless communication. The data store 1008 may be used to store data, such as OTDR traces and OTDR measurement data files. The data store 1008 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 1008 may incorporate electronic, magnetic, optical, and/or other types of storage media.

The memory 1010 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 1010 may incorporate electronic, magnetic, optical, and/or other types of storage media. Note that the memory 1010 may have a distributed architecture, where various components are situated remotely from one another, but can be accessed by the processor 1002. The software in memory 1010 can include one or more computer programs, each of which includes an ordered listing of executable instructions for implementing logical functions. In the example of FIG. 8, the software in the memory 1010 includes a suitable operating system (O/S) 1014 and computer programs 1016. The operating system 1014 essentially controls the execution of other computer programs and provides scheduling, input-output control, file and data management, memory management, and communication control and related services. The program(s) 1016 may include various applications, add-ons, etc. configured to provide end-user functionality with the OTDR device 1000. For example, example programs 1016 may include a web browser to connect with a server for transferring OTDR measurement data files, a dedicated OTDR application software configured to determine OTDR acquisitions by the OTDR acquisition device 1018, set OTDR acquisition parameters, analyze OTDR traces obtained by the OTDR acquisition device 1018 and display a GUI related to the OTDR device 1000. For example, the dedicated OTDR application and/or program(s) 1016 may embody the OTDR analysis module 114, configured to analyze acquired OTDR traces in order to characterize the optical fiber link under test, and produce OTDR measurement data files, and event investigation module 146 for determining values of one or more OTDR acquisition parameters for one or more event-specific OTDR acquisition to be performed toward the optical fiber link.

It is noted that, in some embodiments, the I/O interfaces 1004 may be provided via a physically distinct mobile device (not shown), such as a handheld computer, a smartphone, a tablet computer, a laptop computer, a wearable computer or the like, e.g., communicatively coupled to the OTDR device 1000 via the radio 106. In such cases, at least some of the programs 1016 may be located in a memory of such a mobile device, for execution by a processor of the physically distinct device. The mobile may then also include a radio and be used to transfer OTDR measurement data files toward a remote test application residing, e.g., on a server.

It should be noted that the OTDR device shown in FIG. 8 is meant as an illustrative example only. Numerous types of computer systems are available and can be used to implement the OTDR device.

Example of OTDR Acquisition Device Architecture

Figure 9:
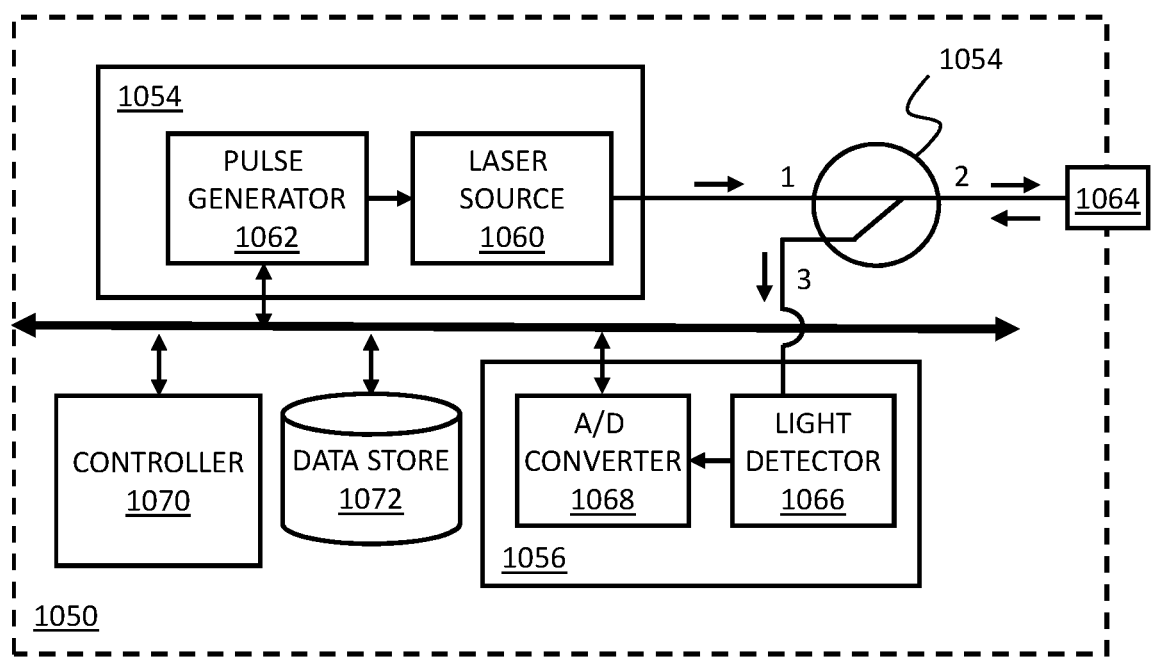
FIG. 9 is a block diagram illustrating an example embodiment of an OTDR acquisition device of the OTDR device of FIG. 8.

FIG. 9 is a block diagram an embodiment of an OTDR acquisition device 1050 which may embody the OTDR acquisition device 1018 of the OTDR device 1000 of FIG. 8.

The OTDR acquisition device 1050 is connectable toward the tested optical fiber link via an output interface 1064, for performing OTDR acquisitions toward the optical fiber link. The OTDR acquisition device 1050 comprises conventional optical hardware and electronics as known in the art for performing OTDR acquisitions over an optical fiber link.

The OTDR acquisition device 1050 comprises a light generating assembly 1054, a detection assembly 1056, a directional coupler 1058, as well as a controller 1070 and a data store 1072.

The light generating assembly 1054 is embodied by a laser source 1060 driven by a pulse generator 1062 to generate the OTDR test signal comprising test light pulses having desired characteristics. As known in the art, the light generating assembly 1054 is adapted to generate test light pulses of varied pulse widths, repetition periods and optical power through a proper control of the pattern produced by the pulse generator 1062. One skilled in the art will understand that it may be beneficial or required by the application to perform OTDR measurements at various different wavelengths. For this purpose, in some embodiments, the light generating assembly 1054 is adapted to generate test light pulses having varied wavelengths by employing a laser source 1060 that is tunable for example. It will be understood that the light generating assembly 1054 may combine both pulse width and wavelength control capabilities. Of course, different and/or additional components may be provided in the light generating assembly, such as modulators, lenses, mirrors, optical filters, wavelength selectors and the like.

The light generating assembly 1054 is coupled to the output interface 1064 of the OTDR acquisition device 1050 through a directional coupler 1058, such as a circulator, having three or more ports. The first port is connected to the light generating assembly 1054 to receive the test light pulses therefrom. The second port is connected toward the output interface 1064. The third port is connected to the detection assembly 1056. The connections are such that test light pulses generated by the light generating assembly 1054 are coupled to the output interface 1064 and that the return light signal arising from backscattering and reflections along the optical fiber link 110 is coupled to the detection assembly 1056.

The detection assembly 1056 comprises a light detector 1066, such as a photodiode, an avalanche photodiode or any other suitable photodetector, which detects the return light signal corresponding to each test light pulse, and an analog to digital converter 1068 to convert the electrical signal proportional to the detected return light signal from analog to digital in order to allow data storage and processing. It will be understood that the detected return light signal may of course be amplified, filtered or otherwise processed before analog to digital conversion. The power level of return light signal as a function of time, which is obtained from the detection and conversion above, is referred to as one acquisition of an OTDR trace. One skilled in the art will readily understand that in the context of OTDR methods and systems, each light acquisition generally involves propagating a large number of substantially identical light pulses in the optical fiber link and averaging the results, in order to improve the Signal-to-Noise Ratio (SNR). In this case, the result obtained from averaging is herein referred to as an OTDR trace.

Of course, the OTDR acquisition device 1050 may also be used to perform multiple acquisitions with varied pulse widths to obtain a multi-pulsewidth OTDR measurement.

The OTDR acquisition device 1050, and more specifically the light generating assembly 1054 is controlled by the controller 1070. The controller 1070 is a hardware logic device. It may comprise one or more Field Programmable Gate Array (FPGA); one or more Application Specific Integrated Circuits (ASICs) or one or more processors, configured with a logic state machine or stored program instructions. When the OTDR acquisition device 1050 is in operation, the controller 1070 is configured to control the OTDR measurement process. The controller 1070 controls parameters of the light generating assembly 1054 according to OTDR acquisition parameters that are either provided by the operator of the OTDR software or otherwise determined by program(s) 1016.

The data store 1072 may be used to cumulate raw data received from the detection assembly 1056, as well as intermediary averaged results and resulting OTDR traces. The data store 908 may include any of volatile memory elements (e.g., random access memory (RAM, such as DRAM, SRAM, SDRAM, and the like)) or the like and it may be embedded with the controller 1070 or distinct.

The OTDR traces acquired by the OTDR acquisition device 1050 may be received and analyzed by one or more of the computer programs 1016 or 816 and/or stored in data store 1008 for further processing.

It should be noted that the architecture of the OTDR acquisition device 1050 as shown in FIG. 9 is meant as an illustrative example only. Numerous types of optical and electronic components are available and can be used to implement the OTDR acquisition device.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

In accordance with one aspect, there is provided an OTDR method for characterizing an optical fiber link, the OTDR method comprising:

performing at least one first OTDR acquisition toward the optical fiber link, wherein each OTDR acquisition is performed by propagating in the optical fiber link under test, a test signal corresponding to a first pulse width and detecting corresponding return light from the optical fiber link so as to obtain an OTDR trace representing backscattered and reflected light as a function of distance in the optical fiber link;

from said at least one first OTDR acquisition, identifying one or more events along the optical fiber link and estimating a value of at least one characteristic associated with each said one or more events;

determining values of one or more OTDR acquisition parameters at least as a function of a characteristic associated with a target event among said events, said OTDR acquisition parameters comprising a second pulse width different from said first pulse width;

performing a second OTDR acquisition toward the optical fiber link using the determined OTDR acquisition parameters.

In some embodiments, the second pulse width is shorter than the first pulse width. Alternatively, or in addition, the determined values for the one or more OTDR acquisition parameters may specify a greater averaging number, resulting in a longer acquisition time. More generally, values for the one or more OTDR acquisition parameters can be selected to improve the spatial resolution of the second OTDR acquisition compared to the first OTDR acquisition. Hence, in some embodiments, the spatial resolution of one or more events which do not meet the evaluation criteria may be analysed with improved spatial resolution by way of a second OTDR acquisition using the determined values for the one or more OTDR acquisition parameters. Values of the one or more OTDR acquisition parameters may be determined as a function (e.g. a predetermined function) of one or more characteristics associated with a target event, for instance as a function of a loss and/or reflectance associated with the target event. More generally, as will be understood from the foregoing, the values of the one or more OTDR acquisition parameters may be determined by analysing data derived from the first OTDR acquisition. In some embodiments, the method further comprises, from the at least second OTDR acquisition, deriving an updated value of at least one characteristic associated with said event or merged events associated with said event.

In some embodiments, the method further comprises comparing the estimated value of at least one characteristic to an evaluation criterion, wherein the estimated value of at least one characteristic associated with said target event does not meet an evaluation criterion.

In some embodiments, the method further comprises: from the at least second OTDR acquisition, deriving a value of at least one characteristic of merged events comprised in said target event.

In some embodiments, the method further comprises: from the at least second OTDR acquisition, deriving an updated value of at least one characteristic associated with said target event.

In some embodiments, the steps of a) determining values of one or more OTDR acquisition parameters and b) performing at least a second OTDR acquisition are performed only if the estimated value of at least one characteristic associated with at least one of said events does not meet an evaluation criterion.

In some embodiments, a plurality of events are identified along the optical fiber link from the first OTDR acquisition and wherein said values of one or more OTDR acquisition parameters are determined as a function of at least one characteristic associated with said target event among the plurality of events.

In some embodiments, said OTDR acquisition parameters comprise one or more of an OTDR test signal pulse width, an OTDR signal pulse repetition rate and an OTDR acquisition time.

In some embodiments, the characteristic associated with said target event comprises at least one of an insertion loss and a cumulated loss before the target event.

In some embodiments, said target event comprises a remote end of the optical fiber link under test and wherein OTDR acquisitions performed using the determined OTDR acquisition parameters are repeated in a continuous manner; and a value of at least one characteristic associated with said target event being estimated and displayed for each repeated OTDR acquisition.

In accordance with another aspect, there is provided a computer program comprising instructions that, when executed by a processor, cause the processor to perform any one of the herein described methods.

In accordance with yet another aspect, there is provided an OTDR device for characterizing an optical fiber link, the OTDR device comprising:

an OTDR acquisition device connectable toward an end of the optical fiber link for performing one or more OTDR acquisitions toward the optical fiber link, wherein each OTDR acquisition is performed by propagating in the optical fiber link under test, a test signal corresponding to a first pulse width and detecting corresponding return light signal from the optical fiber link so as to obtain an OTDR trace representing backscattered and reflected light as a function of distance in the optical fiber link; and a processing unit receiving the OTDR trace and comprising:
an analyzing module configured for identifying an event along the optical fiber link from at least the OTDR trace, and for estimating a value of at least one characteristic associated with said event; and
an event investigation module configured for determining values of one or more OTDR acquisition parameters for at least a second OTDR acquisition to be performed toward the optical fiber link, at least as a function of one characteristic associated with said event, said OTDR acquisition parameters comprising a second pulse width different from said first pulse width.

In some embodiments, the analyzing module is further configured to compare the estimated values of at least one characteristic of said events to an evaluation criterion, wherein the estimated value of at least one characteristic associated with said target event does not meet an evaluation criterion.

In some embodiments, the analyzing module is further configured to derive, from the at least second OTDR acquisition, a value of at least one characteristic of merged events comprised in said target event.

In some embodiments, the analyzing module is further configured to: from the at least second OTDR acquisition, derive an updated value of at least one characteristic associated with said target event.

In some embodiments, said OTDR acquisition parameters comprise one or more of an OTDR test signal pulse width, an OTDR signal pulse repetition rate and an OTDR acquisition time.

In some embodiments, the characteristic associated with said events comprises at least one of an insertion loss and a cumulated loss before the target event.

In accordance with another aspect, there is provided a non-transitory computer-readable storage medium comprising instructions that, when executed, cause a processor to perform the steps of:

receiving at least one first OTDR acquisition performed toward an optical fiber link under test, wherein each OTDR acquisition is performed by propagating in the optical fiber link under test, a test signal corresponding to a first pulse width and detecting corresponding return light from the optical fiber link so as to obtain an OTDR trace representing backscattered and reflected light as a function of distance in the optical fiber link under test;

c. from said at least one first OTDR acquisition, identifying one or more events along the optical fiber link and estimating a value of at least one characteristic associated with each said one or more events; and d. determining values of one or more OTDR acquisition parameters at least as a function of a characteristic associated with a target event among said events, said OTDR acquisition parameters comprising a second pulse width different from said first pulse width.

In some embodiments, the non-transitory computer-readable storage medium further comprises instructions that, when executed, cause the processor to perform the steps of: comparing the estimated value of at least one characteristic to an evaluation criterion, wherein the estimated value of at least one characteristic associated with said target event not meet an evaluation criterion, and said target event comprising at least two merged events.

In some embodiments, the non-transitory computer-readable storage medium further comprises instructions that, when executed, cause the processor to perform the steps of: from the at least second OTDR acquisition, deriving an updated value of at least one characteristic associated with said target event or merged events associated with said target event.

In some embodiments, the steps of a) determining values of one or more OTDR acquisition parameters and b) performing at least a second OTDR acquisition are performed only if the estimated value of at least one characteristic associated with at least one of said events does not meet an evaluation criterion.

In accordance with another aspect, there is provided an OTDR method for characterizing an optical fiber link, the OTDR method comprising:

performing at least a first OTDR acquisition toward the optical fiber link, wherein each OTDR acquisition is performed by propagating in the optical fiber link under test, a test signal corresponding to a first pulse width and detecting corresponding return light signal from the optical fiber link so as to obtain an OTDR trace representing backscattered and reflected light as a function of distance in the optical fiber link;

from the at least a first OTDR acquisition, identifying one or more events along the optical fiber link and estimating a value of at least one characteristic associated with each said events;

if the estimated value of at least one characteristic associated with at least one of said events does not meet an evaluation criterion,
performing at least a second OTDR acquisition toward the optical fiber link using a second pulse width different from the first pulse width; and
from the at least second OTDR acquisition, deriving an updated value of said at least one characteristic.

In accordance with another aspect, there is provided an OTDR method for characterizing an optical fiber link, the OTDR method comprising:

performing at least a first OTDR acquisition toward the optical fiber link, wherein each OTDR acquisition is performed by propagating in the optical fiber link under test, a test signal corresponding to a first pulse width and detecting corresponding return light signal from the optical fiber link so as to obtain an OTDR trace representing backscattered and reflected light as a function of distance in the optical fiber link;

from at least the first OTDR acquisition, identifying one or more events along the optical fiber link and estimating a value of at least one characteristic associated with each said events;

comparing each estimated value to an evaluation criterion, wherein the estimated value of at least one characteristic associated with a target event among said events does not meet an evaluation criterion, said target event comprising at least two merged events;

determining values of one or more OTDR acquisition parameters at least as a function of one characteristic associated with said target event, said OTDR acquisition parameters comprising a second pulse width different from said first pulse width;

performing at least a second OTDR acquisition toward the optical fiber link using the determined OTDR acquisition parameters; and from the at least second OTDR acquisition, deriving an updated value of at least one characteristic of each said merged events associated with the target event.

In accordance with yet another aspect, there is provided an OTDR method for characterizing an optical fiber link, the OTDR method comprising:

performing at least a first OTDR acquisition toward the optical fiber link, wherein each OTDR acquisition is performed by propagating in the optical fiber link under test, a test signal corresponding to a first pulse width and detecting corresponding return light signal from the optical fiber link so as to obtain an OTDR trace representing backscattered and reflected light as a function of distance in the optical fiber link;

from at least the first OTDR acquisition, identifying an event along the optical fiber link and estimating a value of at least one characteristic associated with said event;

determining values of one or more OTDR acquisition parameters at least as a function of one characteristic associated with said event, said OTDR acquisition parameters comprising a second pulse width different from said first pulse width; and performing at least a second OTDR acquisition toward the optical fiber link using the determined OTDR acquisition parameters.

In some embodiments, the method further comprises, from the at least second OTDR acquisition, deriving an updated value of at least one characteristic associated with said event or merged events associated with said event.

A plurality of events may be identified along the optical fiber link from the first OTDR acquisition and said values of one or more OTDR acquisition parameters may be determined as a function of at least one characteristic associated with a target event among the plurality of events.

In some embodiments, the dynamic range associated with the second OTDR acquisition does not allow to reach the end of the optical fiber link.

In accordance with still another aspect, there is provided a non-transitory computer readable storage medium with a computer program stored thereon, wherein the computer program is operable to perform an OTDR method for characterizing an optical fiber link, and wherein the computer program includes instructions for instructing one or more processors to perform the steps of:

receiving an OTDR trace from at least a first OTDR acquisition toward the optical fiber link, wherein each OTDR acquisition is performed by propagating in the optical fiber link under test, a test signal corresponding to a first pulse width and detecting corresponding return light signal from the optical fiber link so as to obtain the OTDR trace representing backscattered and reflected light as a function of distance in the optical fiber link;

from at least the first OTDR acquisition, identifying an event along the optical fiber link and estimating a value of at least one characteristic associated with said event;

determining values of one or more OTDR acquisition parameters for at least a second OTDR acquisition to be performed toward the optical fiber link, at least as a function of one characteristic associated with said event, said OTDR acquisition parameters comprising a second pulse width different from said first pulse width.

The embodiments described above are intended to be exemplary only. The scope of the invention is therefore intended to be limited solely by the appended claims.

The invention claimed is:

1. An Optical Time-Domain Reflectometry (OTDR) method for characterizing an optical fiber link, the OTDR method comprising:

performing at least one first OTDR acquisition toward the optical fiber link, wherein each OTDR acquisition is performed by propagating in the optical fiber link under test, a test signal corresponding to a first pulse width and detecting corresponding return light from the optical fiber link so as to obtain an OTDR trace representing backscattered and reflected light as a function of distance in the optical fiber link;

from said at least one first OTDR acquisition, identifying one or more events along the optical fiber link and estimating a value of insertion loss associated with each said one or more events;

if it is determined that the estimated value of insertion loss associated with at least one of said events does not meet an evaluation criterion, performing a second OTDR acquisition toward the optical fiber link using one or more new OTDR acquisition parameters to assess said at least one of said events;

wherein said new OTDR acquisition parameters comprise a second pulse width different from said first pulse width.

2. The method as claimed in claim 1, wherein values of said one or more new OTDR acquisition parameters are determined at least as a function of a characteristic associated with a target event.

3. The method as claimed in claim 2, further comprising: from the second OTDR acquisition, deriving a value of at least one characteristic of merged events comprised in said target event.

4. The method as claimed in claim 2, further comprising: from the second OTDR acquisition, deriving an updated value of insertion loss associated with said target event.

5. The method as claimed in claim 2, wherein a plurality of events are identified along the optical fiber link from the first OTDR acquisition and wherein said values of one or more OTDR acquisition parameters are determined as a function of at least one characteristic associated with said target event among the plurality of events.

6. The method as claimed in claim 2, wherein the characteristic associated with said target event comprises at least one of an insertion loss and a cumulated loss before the target event.

7. The method as claimed in claim 2, wherein said target event comprises a remote end of the optical fiber link under test and wherein OTDR acquisitions performed using the determined OTDR acquisition parameters are repeated in a continuous manner; a value of at least one characteristic associated with said target event being estimated and displayed for each repeated OTDR acquisition.

8. The method as claimed in claim 1, wherein said new OTDR acquisition parameters comprise one or more of an OTDR test signal pulse width, an OTDR signal pulse repetition rate and an OTDR acquisition time.

9. An Optical Time-Domain Reflectometry (OTDR) device for characterizing an optical fiber link, the OTDR device comprising:
- an OTDR acquisition device connectable toward an end of the optical fiber link for performing one or more OTDR acquisitions toward the optical fiber link, wherein each OTDR acquisition is performed by propagating in the optical fiber link under test, a test signal corresponding to a first pulse width and detecting corresponding return light from the optical fiber link so as to obtain an OTDR trace representing backscattered and reflected light as a function of distance in the optical fiber link;
- a processing unit receiving the OTDR trace and configured for:
  - identifying one or more events along the optical fiber link from at least one OTDR trace, and estimating a value of insertion loss associated with each said one or more events; and
  - if it is determined that the estimated value of insertion loss associated with at least one of said events does not meet an evaluation criterion, causing the OTDR acquisition device to launch a second OTDR acquisition toward the optical fiber link using one or more new OTDR acquisition parameters to assess said at least one of said events, wherein said new OTDR acquisition parameters comprises a second pulse width different from said first pulse width.

10. The OTDR device as claimed in claim 9, wherein the processing unit is configured for determining values of said one or more new OTDR acquisition parameters at least as a function of a characteristic associated with a target event.

11. The OTDR device as claimed in claim 10, wherein the processing unit is further configured to derive, from the at least second OTDR acquisition, a value of at least one characteristic of merged events comprised in said target event.

12. The OTDR device as claimed in claim 10, wherein the processing unit is further configured to: from the at least second OTDR acquisition, derive an updated value of insertion loss associated with said target event.

13. The OTDR device as claimed in claim 10, wherein the characteristic associated with said events comprises at least one of an insertion loss and a cumulated loss before the target event.

14. The OTDR device as claimed in claim 9, wherein said OTDR acquisition parameters comprise one or more of an OTDR test signal pulse width, an OTDR signal pulse repetition rate and an OTDR acquisition time.

15. A non-transitory computer-readable storage medium comprising instructions that, when executed, cause a processor to perform the steps of:
- receiving data derived from at least one first Optical Time-Domain Reflectometry (OTDR) acquisition performed toward an optical fiber link under test, wherein each OTDR acquisition is performed by propagating in the optical fiber link under test, a test signal corresponding to a first pulse width and detecting corresponding return light from the optical fiber link so as to obtain an OTDR trace representing backscattered and reflected light as a function of distance in the optical fiber link under test;
- from said at least one first OTDR acquisition, identifying one or more events along the optical fiber link and estimating a value of insertion loss associated with each said one or more events; and
- if it is determined that the estimated value of insertion loss associated with at least one of said events does not meet an evaluation criterion, launching a second OTDR acquisition toward the optical fiber link using one or more new OTDR acquisition parameters to assess said at least one of said events, wherein said new OTDR acquisition parameters comprise a second pulse width different from said first pulse width.

16. The non-transitory computer-readable storage medium as claimed in claim 15, wherein values of one or more new OTDR acquisition parameters are determined at least as a function of a characteristic associated with a target event.

17. The non-transitory computer-readable storage medium as claimed in claim 16, further comprising instructions that, when executed, cause the processor to perform the steps of: from data derived from the second OTDR acquisition, deriving a value of at least one characteristic of merged events comprised in said target event.

18. The non-transitory computer-readable storage medium as claimed in claim 16, further comprising instructions that, when executed, cause the processor to perform the steps of: from data derived from the second OTDR acquisition, deriving an updated value of insertion loss associated with said target event.

* * * * *